(12) United States Patent
Wood et al.

(10) Patent No.: US 9,503,203 B2
(45) Date of Patent: Nov. 22, 2016

(54) WIRELESS INTERFERENCE CANCELLATION

(71) Applicant: Intel Corporation, Santa Clara, CA (US)

(72) Inventors: Steven Andrew Wood, Wiltshire (GB); Nicholas William Whinnett, Wiltshire (GB)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/301,401

(22) Filed: Jun. 11, 2014

(65) Prior Publication Data

US 2014/0362942 A1    Dec. 11, 2014

Related U.S. Application Data

(60) Provisional application No. 61/833,872, filed on Jun. 11, 2013.

(51) Int. Cl.
| | |
|---|---|
| *H04B 15/00* | (2006.01) |
| *H04B 7/00* | (2006.01) |
| *H04B 7/04* | (2006.01) |
| *H04B 7/08* | (2006.01) |
| *H04L 25/06* | (2006.01) |

(52) U.S. Cl.
CPC ............ *H04B 15/00* (2013.01); *H04B 7/0452* (2013.01); *H04B 7/084* (2013.01); *H04L 25/067* (2013.01)

(58) Field of Classification Search
CPC .. H04B 15/00; H04B 7/0452; H04B 7/0413; H04B 7/084

USPC .......................................... 375/259, 260, 267
See application file for complete search history.

(56) References Cited

U.S. PATENT DOCUMENTS

| | | | |
|---|---|---|---|
| 2005/0259765 A1* | 11/2005 | Keller et al. ................... | 375/322 |
| 2007/0198888 A1* | 8/2007 | Zhang ............................ | 714/756 |
| 2013/0198591 A1* | 8/2013 | Kamuf et al. ................. | 714/780 |

OTHER PUBLICATIONS

Berardinelli et al "Turbo Receivers for Singe User MIMO LTE-A Uplink" Vehicular Technology Conference, 2009, VTC Spring 2009, ISSN: 1550-2252.*

(Continued)

*Primary Examiner* — Kevin M Burd
(74) *Attorney, Agent, or Firm* — Schiff Hardin LLP

(57) ABSTRACT

Interference cancellation circuitry is provided for reconstructing a wirelessly transmitted modulated signal in a receiver using output of a decoder for calculating per-bit probabilities corresponding to bit-by-bit estimates of a coded message from which one bit hard decisions and multi-bit soft decision can be derived. A soft modulator reconstructs the transmitted modulated signal by calculating a weighted superposition depending upon the hard decisions and at least one combined value computed by combining two or more of the multi-bit soft decisions corresponding to different bits of the coded message. A soft modulation method using combined value(s) in a weighted superposition of hard decisions and computer program code for calculating the combined values and regenerated modulated signal are also provided. Other embodiments may be described and claimed.

19 Claims, 11 Drawing Sheets

(56) References Cited

OTHER PUBLICATIONS

Bernardinelli et al., "Turbo Receivers for Single User MIMO LTE-A Uplink", Vehicular Technology Conference, 2009. VTC Spring 2009, ISSN: 1550-2252.

Rui Lin et al., "Two-user Cooperative Transmission Using Superposition Modulation and Soft Information Combining", Vehicular Technology Conference Fall (VTC 2010-Fall), 2010 IEEE 72nd, ISSN: 1090-3038.

* cited by examiner

Figure 1: 4PAM Superposition

WIRELESS INTERFERENCE CANCELLATION

CROSS REFERENCE TO RELATED APPLICATIONS

The present application claims priority to U.S. Provisional Patent Application No. 61/833,872, filed 11 Jun. 2013, entitled "SUPERPOSITION BASED ON WEIGHTED HARD DECISIONS", the entire disclosure of which is hereby incorporated by reference.

TECHNICAL FIELD

Embodiments described herein generally relate to the field of communications, and more particularly, to interference cancellation in wireless communication networks.

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE) and LTE-Advanced (LTE-A), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as Wi-Fi. It should be noted that LTE and LTE-A are the same technology, but LTE-A is used to distinguish releases 10 and 11 (current version) of the standard from earlier releases. Wideband Code division Multiple Access (WCDMA), a 3G technology that provides flexible voice and data services by using code division multiple access (CDMA) technology.

In 3GPP radio access network (RAN) LTE and LTE-A systems, the node can be a combination of Evolved Universal Terrestrial Radio Access Network (E-UTRAN) Node Bs (also commonly denoted as evolved Node Bs, enhanced Node Bs, eNodeBs, or eNBs) and their associated layer-2/3 entities such as the Radio Network Controller (RNC), the Radio Resource Controller (RRC), the Media Access Controller (MAC) and parts of higher layers generically referred to as layer-2/3. The node communicates with the wireless device, known as a user equipment (UE). Examples of a UE include a mobile terminal, a tablet computer, a personal digital assistant (PDA) and a machine-type communication (MTC) device. The downlink (DL) transmission can be a communication from the node (or eNodeB) to the wireless device (or UE), and the uplink (UL) transmission can be a communication from the wireless device to the node.

It is known in communication systems such as LTE and LTE-A, to use Multiple Input Multiple Output (MIMO) antenna configurations, which include more than one receiver and more than one transmitter to improve communication performance. MIMO spreads the total transmit power of the antennas to achieve improved reliability of the wireless connection. MIMO results in: (a) diversity gain, which reduces the effects of fading because the receiver can take advantage of signal paths not currently experiencing fades; (b) array gain due to a beamforming effect achieved by transmitting from multiple antennas, directing the transmitted signal towards the UE; and (c) spatial multiplexing gain achieved by transmitting multiple streams of data in parallel using the same set of time and frequency resources and uncorrelated transmission paths allows the receiver to differentiate between the data streams.

In MIMO communication channels, more than one data flow from a given user or more than one user can be assigned to the same communication channel resources in frequency and time. Thus there is a requirement in the receiving apparatus to reliably separate signals corresponding to different users or corresponding to different data flows from the same user. It is known to perform interference cancellation in the receiver to improve the receiver performance in estimating transmitted signals corresponding to different users and/or different data flows. Some of these interference cancellation techniques estimate a most likely transmitted symbol sequence for a received coded message using a process known as "soft modulation", which uses per-bit probabilities output by a decoder. There is a requirement for more efficient interference cancellation in the receiver for both uplink and downlink wireless communications.

BRIEF DESCRIPTION OF THE DRAWINGS

Embodiments described herein are illustrated by way of example, and not by way of limitation, in the figures of the accompanying drawings in which like reference numerals refer to similar elements.

DESCRIPTION OF EMBODIMENTS

Illustrative embodiments of the present disclosure include, but are not limited to, methods, systems and apparatuses for performing interference cancellation using soft modulation.

Figure 1A:
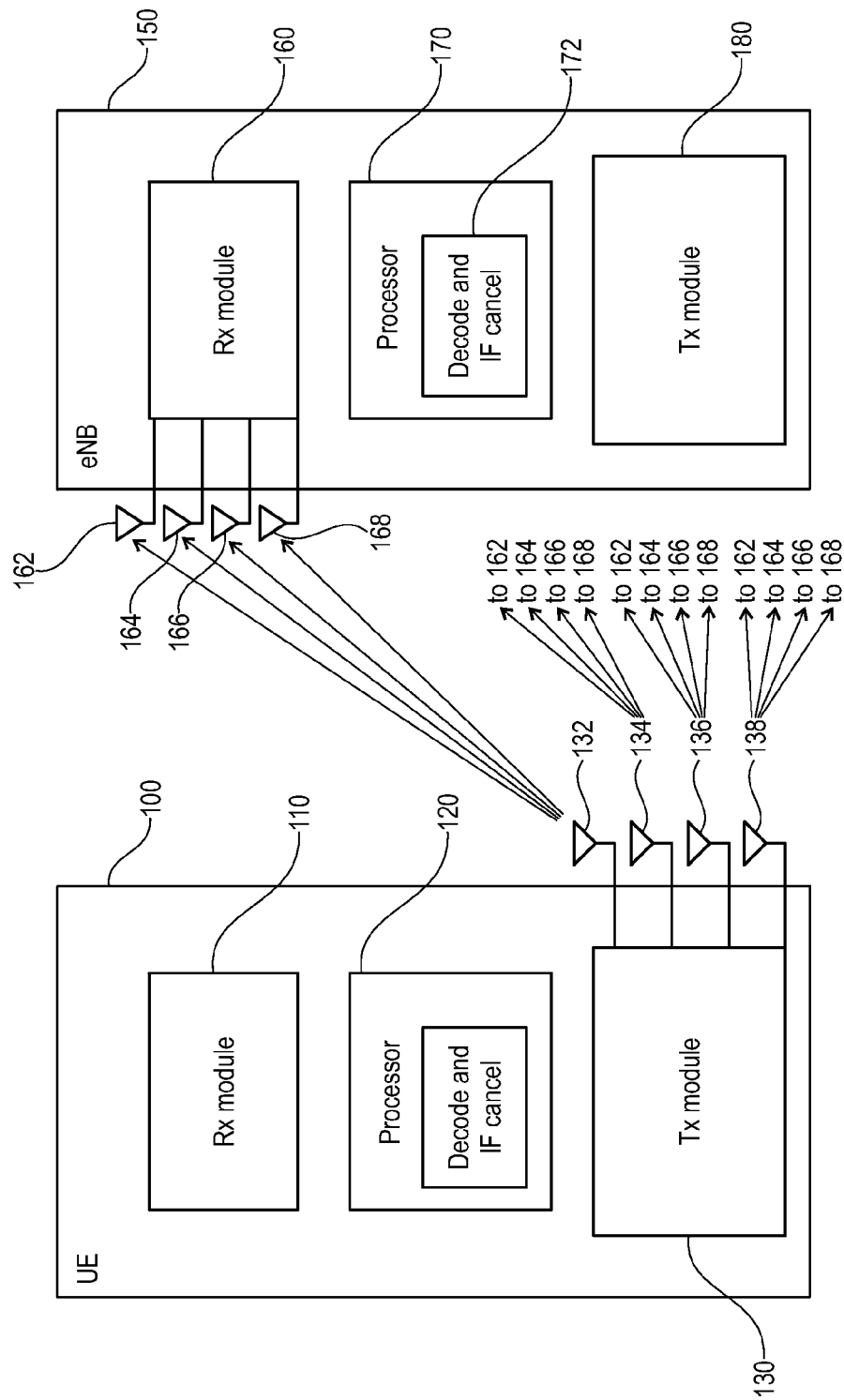
FIG. 1A schematically illustrates Single User MIMO.

FIG. 1A schematically illustrates MIMO communication between a single UE 100 and an eNodeB 150 in a process known as Single User (SU) MIMO. The UE comprises a receiver module 110, processing circuitry 120 having decoding and interference cancellation circuitry 122 and a transmitter module 130. The transmitter module has multiple antennae 132, 134, 136, 138 via which the UE can send uplink communications to the eNodeB 150. A user of the UE can send to the eNodeB four different data streams substantially simultaneously using the same frequency and time physical resources. The eNodeB 150 has a receiver module 160 comprising multiple (in this example four) antennae 162, 164, 166, 168. Each of the receiving antennae 162, 164, 166, 168 is configured to receive a signal from the transmitting antenna 132 of the UE 9 (and also from the other three UE transmission antennas 134, 136, 138). Thus, as indicated in FIG. 1A, each of the four transmit antennas 132, 134, 136, 138 has a wireless connection to each of the four receive antennas 162, 164, 166, 168 of the eNodeB. Due to the different spatial locations of the four receiving antennae 162, 164, 166, 168, the version of the signal received by each antenna will have propagated via a different propagation path relative to the same UE-originating signal received by the other three antennas. These multiple signals can be analysed to estimate the transmitted signal by finding solutions to linear equations formed by a 4×4 channel matrix. The eNodeB also comprises processing circuitry 170 including decoding and interference cancellation circuitry 172 and a transmitter module 180. For simplicity, the antennas on the UE receiving module 110 and the eNodeB transmission module 180, although present, are not shown. For simplicity, the receive modules 110, 160 and the transmit modules 130, 180 are shown as separate entities in FIG. 1A, but in typical embodiments, a transceiver which uses the same antennas for both transmission and reception is used in each of the UE and the eNodeB. Example embodiments using the same transmit/receive antennas include Time Division-LTE, where the same carrier is used for both uplink and downlink and Time Division Duplex (TDD)-WCDMA. Returning to FIG. 1A, the eNodeB 150 uses the decoding and interference cancellation circuitry 172 to reconstruct an interference-mitigated estimate of the signal transmitted by the UE 100 and to apply linear transformations to separate out multiple data streams originating from the same UE 100. For historical reasons, these linear transformations are sometimes referred to as "equalisers".

Figure 1B:
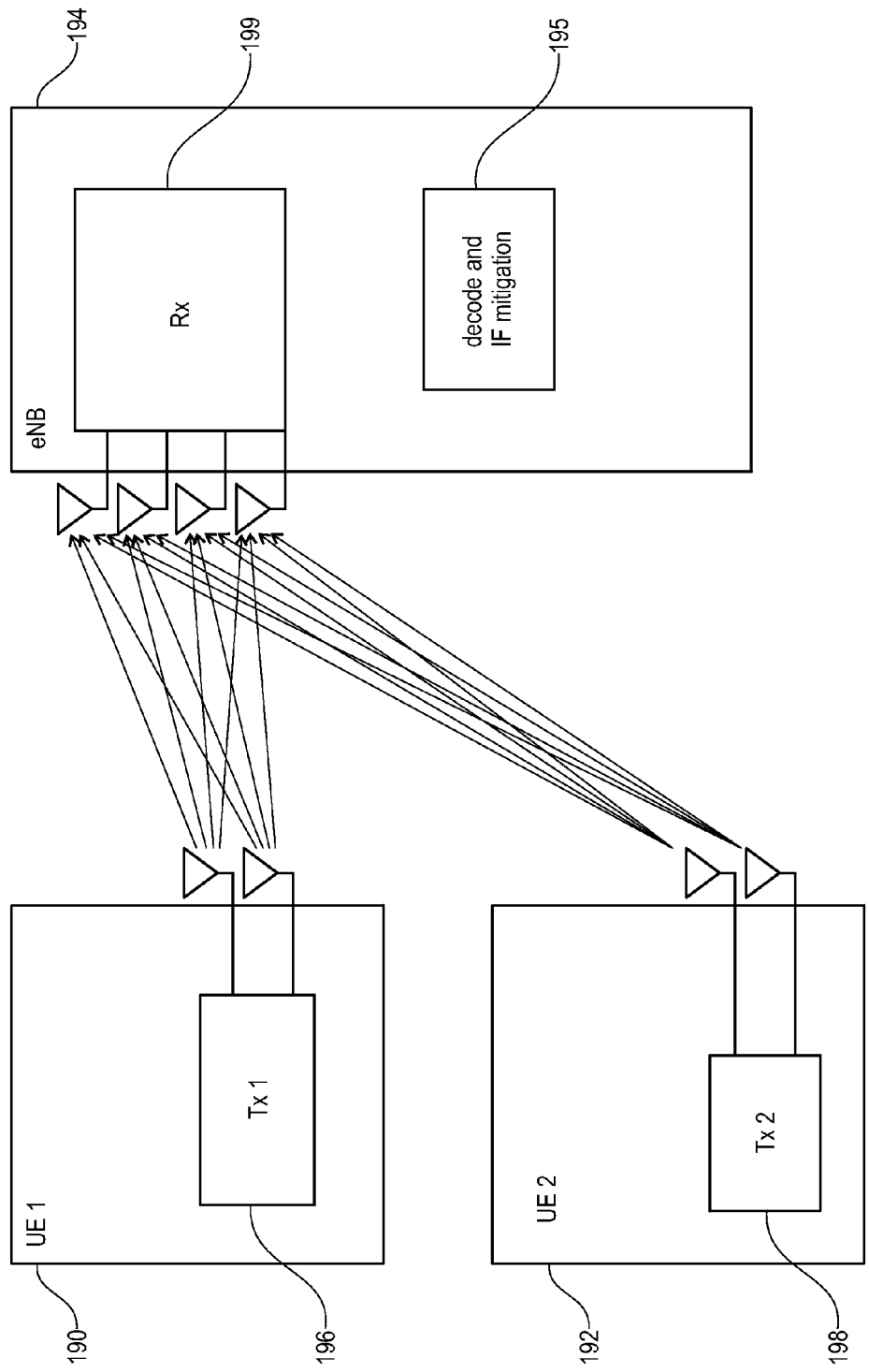
FIG. 1B schematically illustrates MIMO between two UEs and one enodeB.

FIG. 1B schematically illustrates MIMO communication between multiple UEs 190, 194 and an eNodeB 150, known as MU-MIMO. In this particular arrangement, there are two UEs 190, 192 communicating with the eNodeB substantially simultaneously using the same time and frequency resources. The number of UEs substantially simultaneously transmitting to the eNodeB 194 using the same physical resources is not limited to two. The first UE 190 has a transmitter 196 having two antennas and a transmitter 198 of the second UE 192 also has two antennas. A receiver module 199 in the eNodeB has four antennas, all of which are configured to receive communications from all antennas of the first UE 190 and is also configured to receive communications from all antennas of the second UE 192. Similarly to the situation in FIG. 1A, decode and interference circuitry 195 in the eNodeB is configured to apply linear transformations to the received signals to separate out the signals from the two different UEs 190, 192 and also performs interference cancellation using, for example, soft modulation on per-bit estimates from decoding circuitry. Note that although the MU-MIMO arrangement for FIG. 1B shows two transmit antennas per UE and four receiving antennas at the eNodeB, in systems such as this having two-layer uplinks it suffices to have one transmit antenna per UE and two receive antennas in the eNodeB.

The present technique applies to both separation of signals corresponding to different users (MU-MIMO) and separation of signals corresponding to different data channels for the same user (SU-MIMO). In the embodiments described below, where composite signals as described as corresponding to different users and/or interference cancellation and decode circuitry as is indicated as corresponding to a respective user, this is also intended to convey equivalent embodiments where the signals being separated correspond to different data channels of the same user, as in SU-MIMO.

Note that although FIGS. 1A and 1B show the same physical resources being used on uplink channels from a UE to an eNodeB, the present technique can equally be applied to separation and interference cancellation on downlink communications from an eNodeB and received by a UE.

Figure 2:
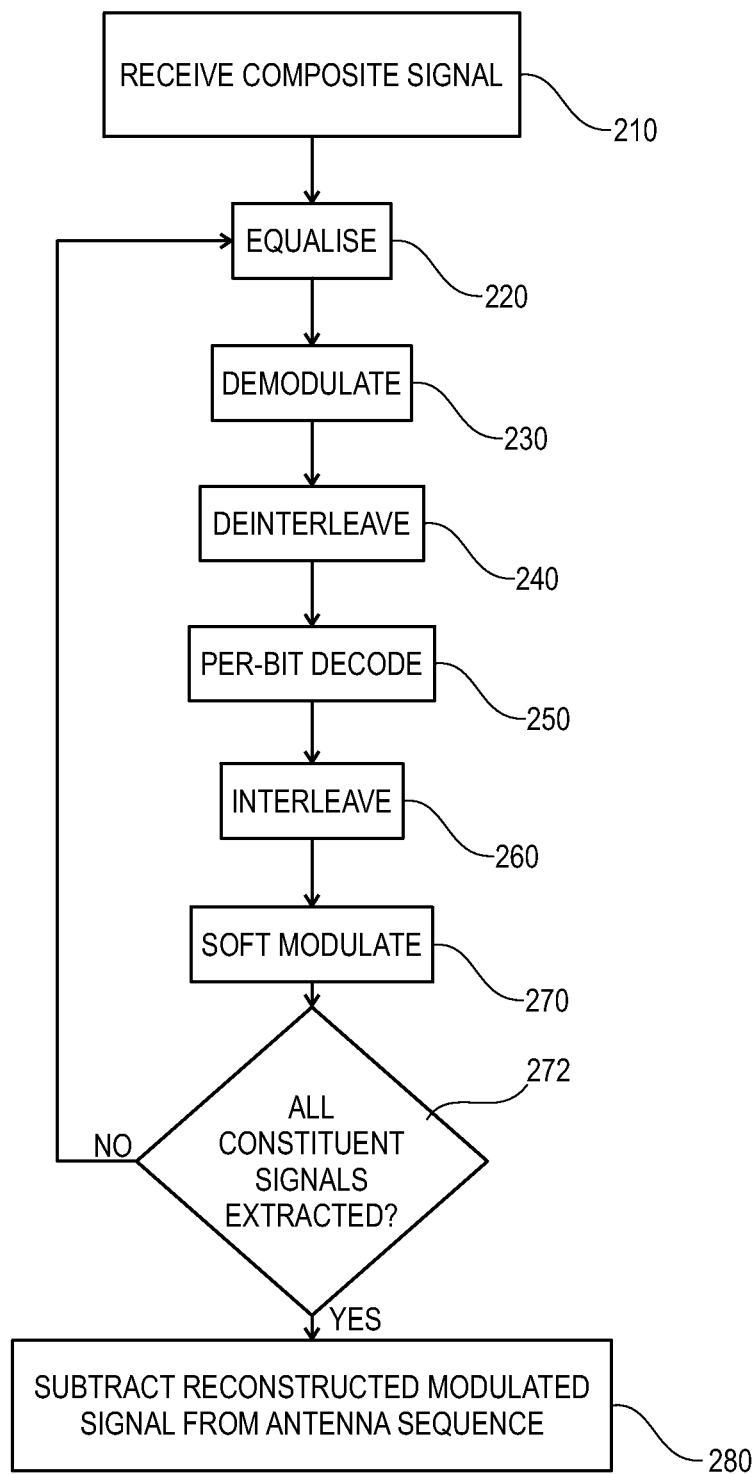
FIG. 2 is a flow chart schematically illustrating an interference cancellation process.

FIG. 2 is a flow chart that schematically illustrates process steps performed during an interference cancellation process to which the present technique can be applied. In this particular example the process is parallel interference cancellation in which all signals (e.g. corresponding to a plurality of different users) are extracted before an interference cancellation operation is performed. At process element 210, composite signals are received at the antennas, the composite signals comprising more than one user's uplink transmissions (MU-MIMO) or more than one data channel from the same user (SU-MIMO), the composite signals each being transmitted by respective different antennas using the same time and frequency resources. Alternatively, the composite signals received at process element 210 are downlink transmissions received by a given UE from an eNode B, the signals comprising multiple data channels sharing the same time and frequency allocations on the propagation channel between from the eNodeB to the UE.

At process element 220 an equaliser is used in an attempt to minimize, or at least reduce, the signal distortions in the channel and, in cases where MIMO has been used, to provide spatial filtering. The equalization process element 220 calculates and outputs estimates of transmitted symbols for each different user or for different data channels associated with the same user (for SU-MIMO). The transmitted symbol estimates output by the process element 220 are subject to estimation-noise and thermal-noise from the radio receiver. These noisy estimates are supplied as input to a demodulation process element 230. At demodulation process element 230 per-bit Log-Likelihood Ratios (LLRs) are derived from each symbol, thus performing a "demodulation". The per-bit LLRs convey the relative likelihoods of each demodulated bit being a logical-0 or logical-1. The sign of the LLR is known to give a "hard decision" for a bit value (0 or 1) and the magnitude of the LLR is known to indicate the reliability of the hard decision.

Output from the demodulation process element 230 of FIG. 2 is supplied to a de-interleave process element 240, which is useful in removing the dependence in the variance of the noise and interference between consecutive symbols. Such dependencies arise from the slowly (relative to the symbol duration) varying radio propagation channel conditions. At the transmitter, an interleaver would be placed between the encoder (e.g. turbo encoder) and the modulator. The interleaving process at the transmitter involves systematically changing a bit sequence so that originally contiguous data is non-contiguous. Interleaving is performed to randomize the fading channel, the fading being due, for example to multipath propagation.

At process element 250, the de-interleaved symbols are presented to a bit-by-bit (or "per bit") decoder. The per-bit decoder iteratively estimates the most likely message that was sent by the transmitter, and it can produce per-bit outputs in the form of LLRs. One example of a per-bit decoder is a Turbo decoder, but the present technique is applicable to any decoder that computers per-bit probabilities. Suitably modified Viterbi decoders or Low Density Parity Check (LDPC) decoders are used in alternative embodiments. The LLRs output by the per-bit decoder process element 250 are interleaved, by an interleave process element 260, back into the same order that they were transmitted in by the UE.

A "soft modulation" process element 270 converts output of the interleaver process element 260 back into the most likely transmitted symbol-sequence by a process referred to as "soft modulation". Soft modulation provides an estimate of the symbol-sequence transmitted on an uplink by the mobile-station (or the eNodeB in the case of a downlink signal) using the per-bit probabilities. Output of the soft modulation process element 270 is a reconstruction or estimation of an individual modulated signal transmitted by the transmitting side of the wireless communication channel. In other words, the output of the soft modulation process element 270 is a reconstructed modulated signal corresponding to a message output by a single UE or to a single data channel of plurality of data channels substantially simultaneously output by a single user (in the case of SU-MIMO).

At process element 272 it is determined whether all of the signals from the composite signal have been separated and reconstructed. If some signals have yet to be extracted, then the process returns to equalize process element 220. If all of the signals have been extracted, then the process proceeds to process element 280, where for each different user or for different data channels associated with the same user (for SU-MIMO), the extracted signals (symbol sequence) output by the soft modulation for interfering users or data channels are subtracted from the received antenna sequence and the process returns to the equalization process element 220 for a subsequent iteration of the interference cancellation circuitry. The whole process may be repeated such that all signals are separated and reconstructed multiple times.

Note that it is in the subtraction of the soft-modulated symbol sequence (at process element 280 of FIG. 2), where the differences in implementation of the interference cancellation process in different wireless communication technologies is most apparent. In both WCDMA and LTE wireless standards, the symbol-sequences are not merely "transmitted". In the LTE case they are converted into the time-domain, while also being given a frequency allocation, as part of the "SC-FDMA" method on the uplink or converted to the frequency domain via OFDMA on the downlink, while in WCDMA the symbol sequences are converted into a wide-band "spread spectrum" signal prior to transmission. However, in both cases, the estimated symbol sequences need to be transformed into sample-sequences that closely represent the samples received after the antenna processing at the receiver so that the interference cancellation can be effectively performed. In the WCDMA case, this involves applying the spreading and scrambling sequences and convolving with the estimated channel impulse-response for each receive antenna. In the LTE case, this involves transformation into the frequency-domain and multiplying by the frequency-domain complex channel-estimates.

After the subtraction of the individual reconstructed signal component at process element 280, the whole demodulation process starts again from equalization process element 220 onwards. The present technique is applicable to soft modulation as applied to interference cancellation in any wireless receiver having a bit-by-bit decoder. One known type of interference cancellation is known as "Successive Interference Cancellation" (SIC). Another known type of interference cancellation is known as "Parallel Interference Cancellation" (PIC). The present technique is applicable to both of these and to interference cancellation in general.

The process elements illustrated by the flow chart of FIG. 2 correspond to Parallel Interference Cancellation, in which signals of all users are extracted before the interference cancellation is performed. In the alternative Successive Interference cancellation embodiment, interference cancellation is performed after the soft modulation process element 270, before a next user signal is decoded. Thus in the SIC process, one user is equalised, decoded and re-modulated first, thus improving the performance of the second user. Next, the second (or subsequent) user is equalised, decoded and re-modulated, thus benefitting from the (partial) removal of the first user. This entire interference cancellation procedure may iterate several times.

In an alternative implementation, in a first iteration of process elements 220 to 270 in FIG. 2, each user may be equalised, decoded and re-modulated in parallel. Thereafter, in the second and subsequent iterations of the interference cancellation process, each user in turn will be equalised, decoded and re-modulated (corresponding to process elements 220 through 270) using the antenna sample processing output with all of the remaining users subtracted from the samples. In other words, user #p will use the samples minus users #1, 2, 3 . . . (p−1) and (p+1), (p+2), . . . , N if there are N users in total.

The present technique relates to improved efficiency and reduced storage requirements allowing for reduced buffer sizes in hardware implementing the per-bit decoding process element 250, the interleaving process element 260 and the soft modulation process element 270. According to the present technique, the soft modulation process element 270 performs a different calculation relative to previously known systems, which allows the "reconstructed" or "regenerated" modulated signals, corresponding to estimates of modulated signals sent across a wireless propagation channel by the transmitter, to be calculated in a simplified way using fewer input parameters, by performing fewer calculating steps and with reduced power and simplified hardware requirements. This calculation according to the present technique will be described in more detail below.

Figure 3:
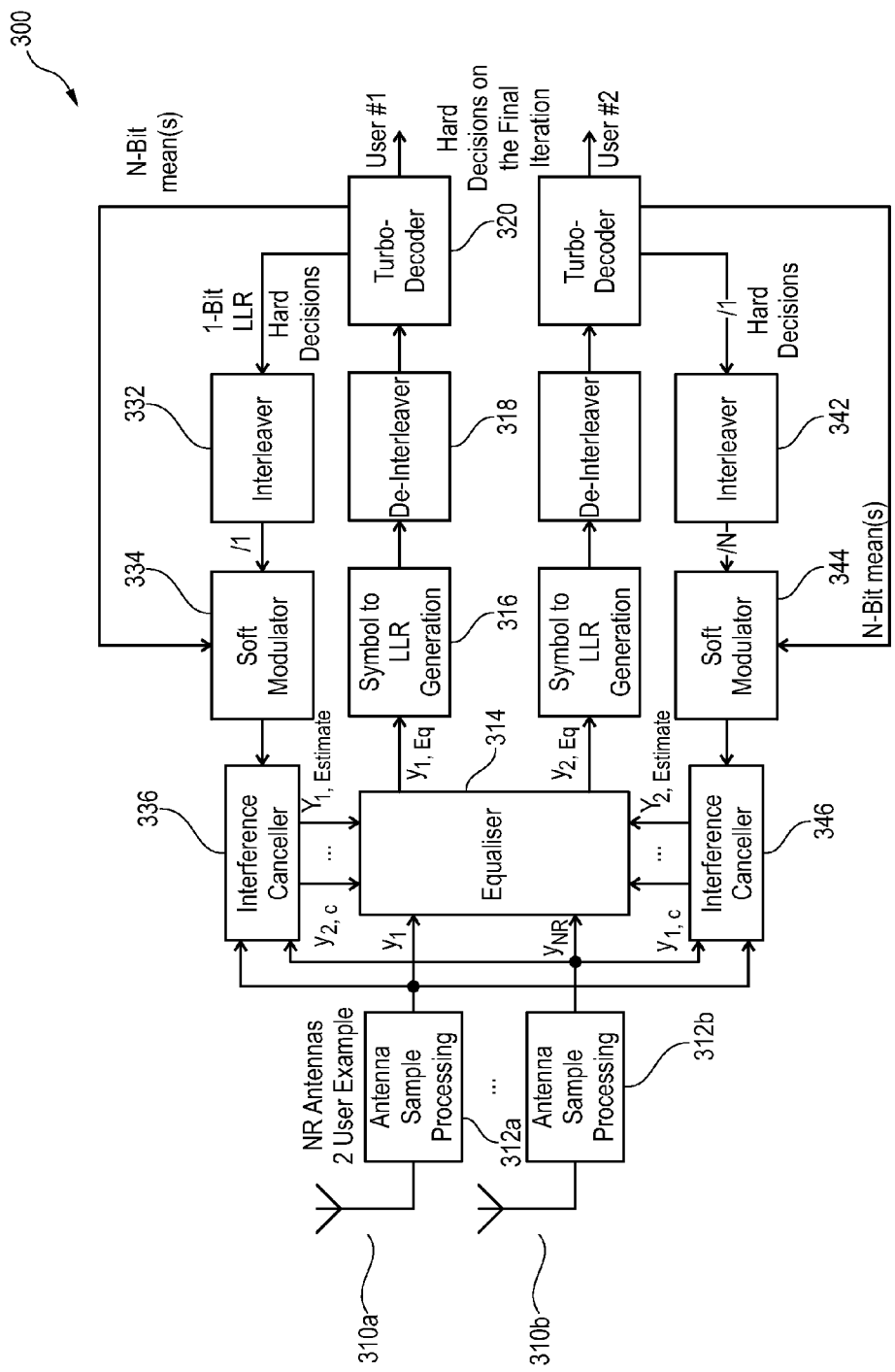
FIG. 3 schematically illustrates a general decoding and parallel interference cancelling apparatus according to a first embodiment.

FIG. 3 schematically illustrates a decoding and interference cancelling system according to an embodiment. FIG. 3 is an example of Parallel Interference Cancellation. The apparatus comprises a plurality of receive antennas 310, capable of receiving signals transmitted from a plurality of transmit antennas. Each transmit antenna is configurable to transmit symbols originating from a different modulation scheme and carrying an independent data stream. All transmitted signals have been substantially simultaneously transmitted using the same frequency spectrum.

The decoding and interference cancelling system 300 comprises a plurality of antenna sampling processing units 312a and 312b, each unit having circuitry dedicated to processing antenna samples corresponding to the associated antenna, which comprises a superposition of different signals and noise. Coded signals from the plurality of antenna sampling processing units 312a, b are all supplied to an equalizer, which applies linear transformations to the signals received by the antennas and the equalized signals for each of the plurality of users are supplied to respective "symbol to LLR generation modules" 316, which calculates a Log Likelihood Ratio, which is a logarithm of a ratio of probabilities for the two possible values of a binary variable. The base of the logarithm used to construct the LLRs is known by the system, as it is required to convert the outputs of the decoder back into probabilities.

The LLR values for the symbols are supplied to de-interleaver circuitry 318 to permute the values according to a predetermined pattern to reverse interleaving performed at the transmitter. The de-interleaved LLRs are supplied to respective turbo decoders 320a and b, which calculate "soft decisions" corresponding to N-bit LLRs representing estimates of the coded message (where N is an integer greater than one). The turbo decoders 320 themselves perform an iterative decoding process, which results in hard decisions on the final iteration. The soft decisions correspond to an N-bit probability that a given symbol has a binary value of zero whereas a hard decision corresponds to a single-bit value for the same probability. The soft decision is effectively a finer quantisation of the estimated bit than the hard decision, the additional bits in the soft decision providing an indication of how much closer the estimated symbol is to being a one rather than a zero or vice versa.

The per-bit probabilities (alternatively denoted "soft decisions") output by the decoder 320 are used in an interference cancellation process performed on the signal corresponding to a first user by a first interleaver 332, a first soft modulator 334 and a first interference canceller 336. An output of the soft modulator 334 corresponds to a reconstructed modulated transmitted signal corresponding to the first user and this estimate of the transmitted signal is supplied to the interference canceller 336, where it can be extracted from the antenna samples making it easier for individual signals corresponding to other users to be more accurately estimated. In this parallel interference cancelling arrangement there is second branch of interference cancellation processing configured to operate concurrently with the circuitry 332, 334, 336 operating on the signal corresponding to the first user. The second series of interference cancellation circuitry comprises a second interleaver 342, a second soft modulator 344 and a separate interference canceller 346.

In the FIG. 3 embodiment there are two distinct processing chains starting with the symbol to LLR generators 316 and finishing with the interference cancellers 336, 346, which have been identified as processing respective signals corresponding to different users, but in other embodiments these processing chains could alternatively correspond to processing chains for processing respective independent data streams associated with a single user (SU-MIMO). The same applies to the embodiments of FIGS. 4 and 5.

Interference cancellation as implemented by the apparatus of FIG. 3 exploits the Maximum A-Posteriori (MAP) bit-by-bit decoding methods used in decoders such as Turbo-decoders. In particular, the example method uses A-Posteriori Probability (APP) Log Likelihood Ratios (LLRs) that are computed by the decoders 320 a and b. The definition a-posteriori probability is well-known to those skilled in the art and is generally defined to be P(x|r), i.e. the probability of x given r, where r is a received signal and x is the message. Account has to be taken of the fact that the received signal will be affected by noise on the propagation channel. In addition to generating APP LLR's, per-bit decoders such as turbo decoders can also produce "extrinsic probabilities" for: each systematic bit (i.e. bits of the message); and for parity bits (bits added to mitigate error due to transmission across a noisy communication channel). The APP LLR is the sum of the input (intrinsic) LLR to the decoder and the extrinsic LLR output by the per-bit decoder.

According to the present technique the turbo-decoders require modification relative to standard decoders so that they produce APP LLR outputs for both parity bits and systematic bits of a coded message. This modification may also be required for other interference cancellation techniques. For example, and a rate 1/3 encoder will produce two parity bits per systematic bit (leading to 1-in-3-out). The parity bits allow for basic error detection at the receiver.

In interference cancellation, the APP LLR outputs of the decoders 320a, b are used to compute a per-bit probability of error $Pe_b$ for b=0 . . . B−1, where B is the total number of bits in the decoder output. In some embodiments B is the total number of systematic bits only but in other embodiments B is the total number of systematic bits and at least some parity bits. The per-bit probability of error $Pe_b$ is the probability that the hard decision based on the APP LLRs is in error. There are also B APP LLRs: $LLR_{app_b}$, i.e. the number of AP LRRs is also equal to the total number of decoder output bits. The computation of $Pe_b$ from $LLR_{app_b}$ for each of the bits, b, is well known to those skilled in the art, so will not be described further here.

The present technique relates to the use of the values of the per-bit probabilities of error $Pe_b$ and their application in providing estimates of interference and in performing interference cancellation by performing soft modulation to estimate a modulated signal that was output by the transmitter. In particular, the present technique provides a method, an apparatus and associated computer program code allowing for more efficient estimation of interfering signals, such as signals from other users transmitted using the same time and frequency physical resources using different antennas.

Previously known techniques involve producing estimates of interference using a full set of per-bit probabilities of error ($Pe_b$), one for each decoded bit. The present technique reduces the complexity associated with this interference estimation process by recognizing that less than a full set of per-bit probabilities of error is required for this purpose. According to the present technique two or more of the full set of per-bit probabilities of error corresponding to different coded bits are combined and used to calculate a weighted sum or superposition of possible modulation symbols, the sum depending upon the hard decisions output by the decoder 320. Combining two or more of the of $Pe_b$ values in this way such that less than a full set of the values is required for estimation of a modulated interfering signal means that less buffering is required in at least one of the turbo decoder 320, the interleavers 332, 342 and the soft modulators 334, 344. Simplification of the weighted superposition calculation by suitably combining the per-bit probabilities also reduces overall the silicon area required to produce estimates of the interference that are obtained from the $Pe_b$ values. The way in which the soft modulation calculation performed by the soft modulators 334, 344 is simplified according to the present technique will be described in more detail below with reference to FIG. 6A.

As an alternative to using the per-bit probabilities derived from the APP LLR as in the apparatus of FIG. 3, extrinsic probabilities could be used. According to this alternative implementation iterations of the turbo coder (or other per-bit decoder) are unwrapped and the soft remapping and interference cancellation are performed within these iterations of the turbo decoder, making use of the extrinsic probabilities.

Figure 4:
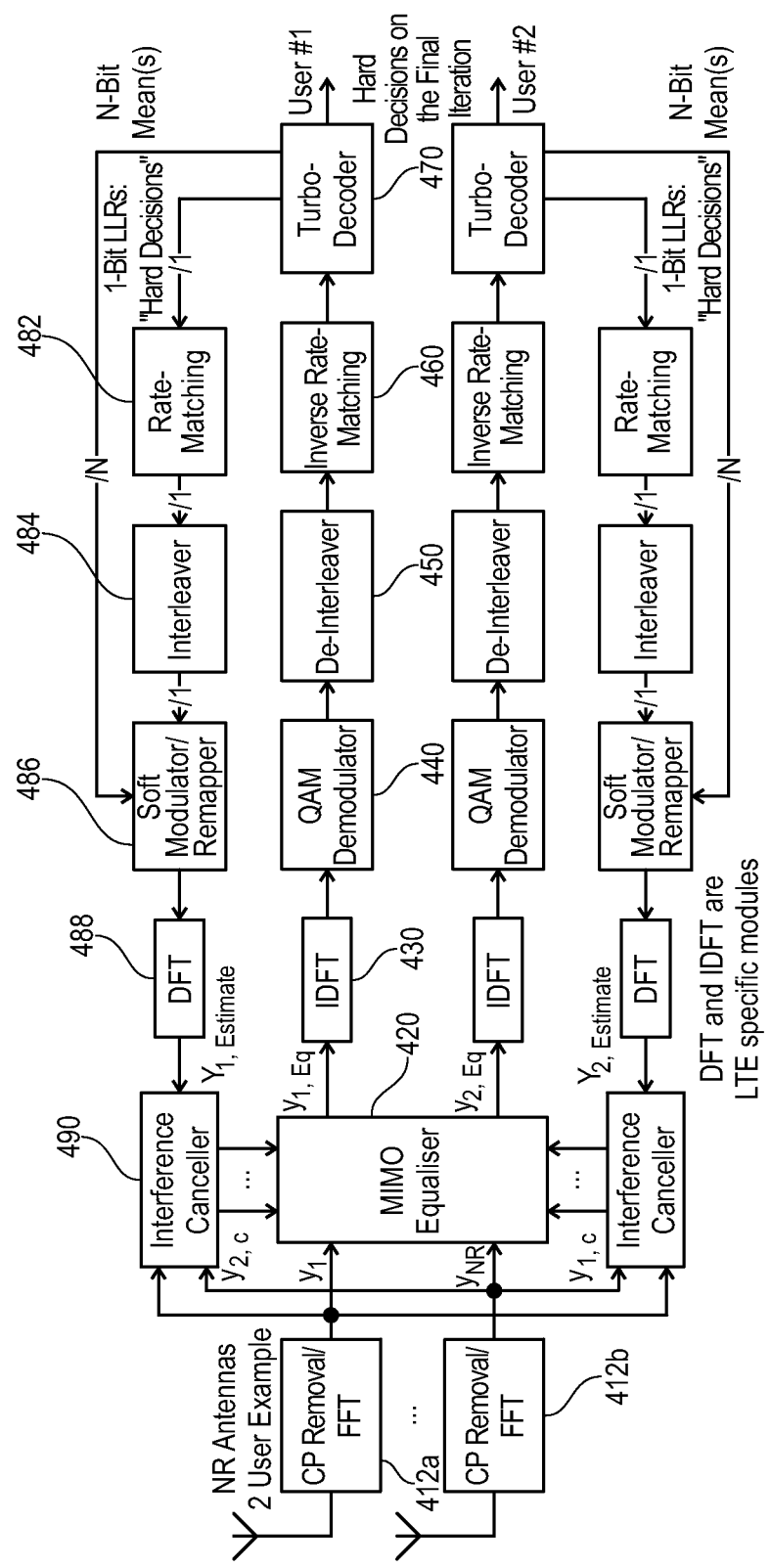
FIG. 4 schematically illustrates an LTE decoding and parallel interference cancelling apparatus according to a second embodiment.

FIG. 4 schematically illustrates decoding and interference cancellation circuitry according to the present technique as implemented in an LTE wireless technology system on uplink communications. Note that the present technique is equally applicable to downlink communications. The FIG. 4 arrangement, similarly to the FIG. 3 arrangement, implements parallel interference calculation where interference is performed substantially simultaneously for two (or more) different users whose messages have been sent using the same physical resources in time and frequency. The LTE uplink implements Single Carrier FDMA (SC FDMA) and this requires the presence of Discrete Fourier Transform (DFT) and Inverse Discrete Fourier Transform (IDFT) circuitry in the system 400. Each of a plurality of receiving antennas has an associated Cyclic prefix (CP) removal and Fast Fourier Transform (FFT) circuitry module 412a, 412b, through which the received signals pass before encountering a MIMO equalizer 420. Equalised signals for each user are passed to a respective IDFT module 430 to map the equalized signal from a frequency domain to a time domain. An FFT is a computationally efficient method of calculating a Discrete Fourier Transform. The skilled person in LTE will be aware that in LTE the term DFT is used to describe an "additional" transform conventionally used the uplink SC-FDMA scheme. The traditional use of the term FFT relates to radix-2 FFT, which must be a power of 2 in length. By way of contrast, the DFT according to some embodiments of the present technique can be any combination of $2^A*3^B*5^C$ in length and although not a conventional FFT can still be calculated using "fast" methods.

Output of the IDFT module is demodulated by Quadrature Amplitude Modulation (QAM) demodulator 440 and then supplied to a de-interleaver 450, an inverse rate matcher 460 and a turbo decoder 470. An interference cancellation arm of the circuitry comprises, for each user, a rate matching module 482, an interleaver 484, a soft modulator/remapper 486, a DFT module 488 and an interference canceller 490. The interference canceller 490 subtracts the estimated modulated transmitted signal for the particular user from the antenna samples and the equalizer 420 then tries to separate the signal from residual interference and noise. One way in which the FIG. 4 apparatus differs from the FIG. 3 apparatus is that it comprises inverse rate matching circuitry 450 in the decode path and rate matching circuitry 482 in the interference cancellation path.

Rate matching is a part of the encoding and decoding process in the 3GPP WCDMA/LTE and IEEE WiMAX standards. Turbo-codes, like all channel codes, are employed so that messages can be transmitted through a noisy channel as reliably as possible given technology and channel capacity constraints. In general, channel coders map input messages that may be many bits long to codewords that will always be longer than the input message. The ratio of the input message length to the output message length is called the code-rate. In the LTE case and WCDMA Turbo-coded cases, the encoder typically has a rate of 1/3. This means that a 1000 bit message, for example, will be encoded into a 3000-bit codeword (plus some overheads not relevant to the point in hand).

If the channel conditions are poor, a rate-1/3 code may be desirable. However, if channel conditions are good then the extra transmitted bits may be wasteful and a higher code-rate of, say, 5/6 may be preferred. In other words, the radio-channel under good conditions may be able to support a higher-rate code.

Rate-Matching is a method where the output of the Turbo-encoder is modified according to the expected conditions of the channel. If the conditions are good, then the rate-matching may be set to ignore, for example, 1500 of the 3000 encoder output bits. This is called "puncturing", and the result is a combined encoder and rate-matching apparatus that has an effective code-rate of 1000/1500.

Alternatively, if the conditions are very poor then the rate-matching can be set to repeat some of the encoder output bits. If 1500 output bits were repeated, then the effective code-rate would be 1000/4500.

The rate-matching unit in a transmitter (not shown), using a method defined by the relevant standards documents, selectively punctures or repeats bits according to the rate-matching parameters provided by the control software. The same rate matching is performed by the rate matching module 482 of the interference regeneration circuitry in provided in the receiver as illustrated by FIG. 4.

When rate-matching is reversed at the receiver (e.g. by Inverse Rate matching module 460 of FIG. 4), punctured LLRs are replaced with a '0' and repeated LLRs are accumulated so that exactly 3000 LLRs will be presented to the decoder for decoding back into 1000 message bits.

Turbo-encoders have two classes of output bits: systematic and parity bits. The systematic bits are simply the message bits, and there will be 1000 in the previous example. The parity bits are additional bits generated by the encoder, and a rate 1/3 encoder will produce two parity bits per systematic bit (leading to 1-in-3-out). In order to perform any form of Turbo interference cancellation, the Turbo-decoder should output all 1000 systematic bits, 1000 parity-1 bits and 1000 parity-2 bits. Turbo decoders not designed for this purpose would typically only output the sign of the LLRs of the 1000 systematic bits (the signs of the LLRs corresponding to hard decisions).

In the Turbo decoding SIC loops (see FIG. 5 and the associated description below) and PIC loops (as in FIG. 4), the rate-matching is used twice per iteration:
1) Firstly in the decoder path: this ensures that all 3N bits are presented to the decoder as systematic, parity-1 and parity-2 bits. Punctured parity bits that were not transmitted will be replaced with '0' ("don't know" in LLR terms). Where an LLR is repeated, it will be accumulated into one summed LLR.
2) Secondly in the regeneration path: this ensures that the 3N output bits from the turbo decoder are properly punctured or repeated in the same way as they would have been at the mobile transmitter.

As shown in FIG. 4, according to the present technique, the turbo decoder 470 (for each user) outputs single-bit hard decisions for each coded symbol to the rate matching module 482 of the interference regeneration arm of the circuitry. As a consequence the interleaver and the soft modulator/remapper also receive one-bit values. The turbo decoder also outputs multi-bit mean values (or at least one other combined value) calculated from the per-bit probabilities of error, $Pe_b$. The number of multi-bit mean values supplied to the soft modulator/remapper is fewer that the total number of per-bit probabilities of error $Pe_b$ (the total number being equal to the total number of decoder output bits). In previously known techniques the multi-bit means were not calculated at all and the full set of per-bit probabilities of error, $Pe_b$ were all required for calculations performed by the rate matching module, the interleaver and the soft modulator.

Figure 5:
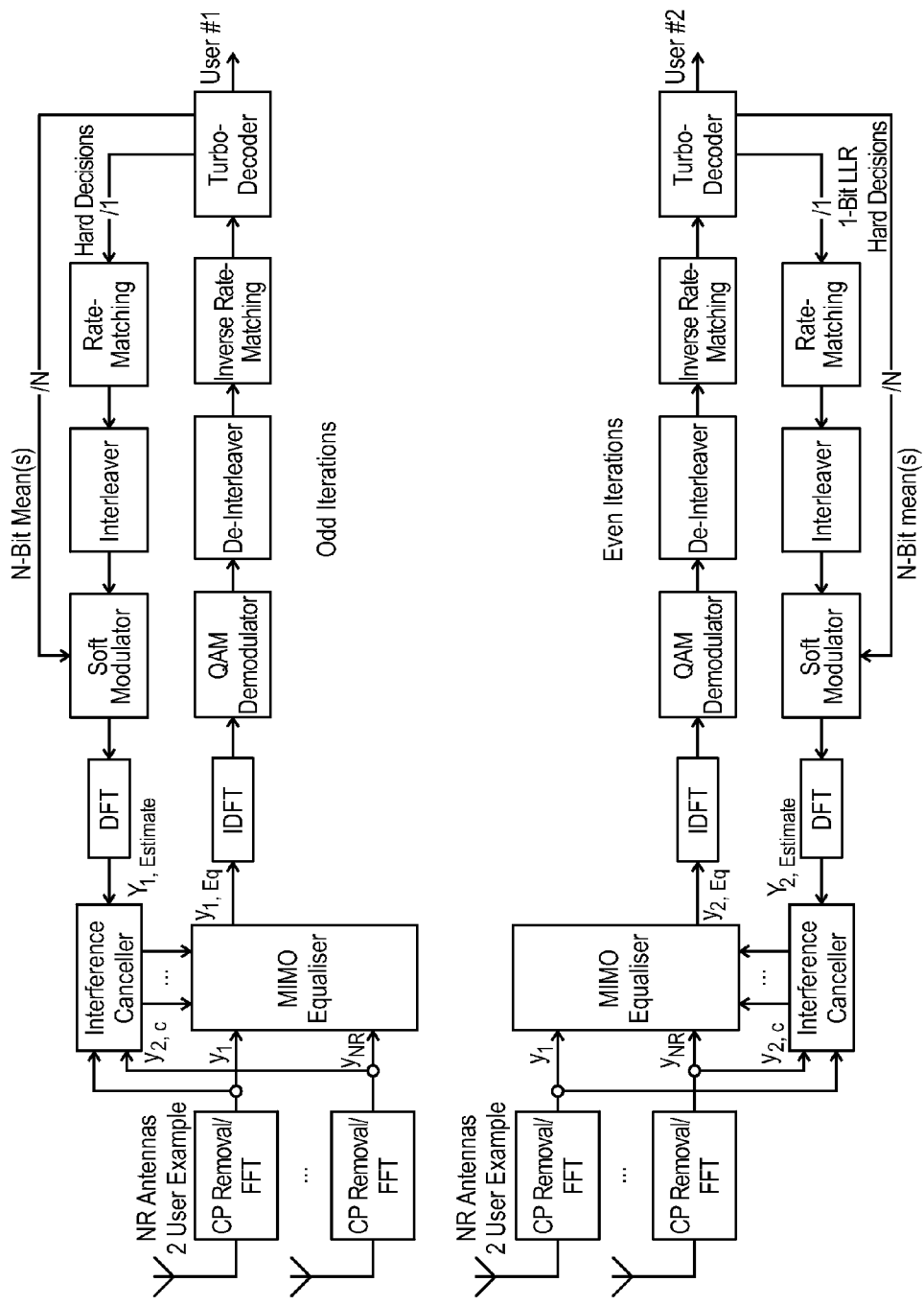
FIG. 5 schematically illustrates an LTE decoding and successive interference cancelling apparatus according to a third embodiment.

FIG. 5 schematically illustrates decode and interference cancellation circuitry according to the present technique, which is equivalent to the LTE uplink wireless technology implementation of FIG. 4, but uses Successive Interference Calculation rather than parallel Interference Calculation. The individual modules have similar functions to those described above in relation to FIG. 4. However, one main difference is that in the FIG. 5 apparatus, the decode and interference branches of the circuitry for user 1 do not operate in parallel with the decode and interference branches of the circuitry for user 2. Instead in FIG. 5 the apparatus is configured such that for odd iterations of the interference regeneration and cancellation circuitry processing is performed for the first user only (or first data channel in SU-MIMO case) and for even iterations of the decoder processing is performed for the second user only (or second data channel in SU-MIMO case). However, similarly to FIG. 4, only hard decisions and not the soft decisions from the decoder are supplied to the rate matching circuitry and at least one combined value of the per-bit probabilities of error (e.g. a mean value for a given modulation bit position) is supplied directly from each of the decoders to each of the soft modulators so that the full set of per-bit probabilities of error, $Pe_b$ is not required for the purpose of the soft modulation.

The decoding and interference cancellation circuitry according to the present technique can be implemented in any receiver. In some embodiments, interference cancellation circuitry according to the present technique is implemented in the user equipment. In other embodiments, interference cancellation circuitry according to the present technique is implemented in a base station subsystem such as a base station or an eNodeB.

Figure 6A:
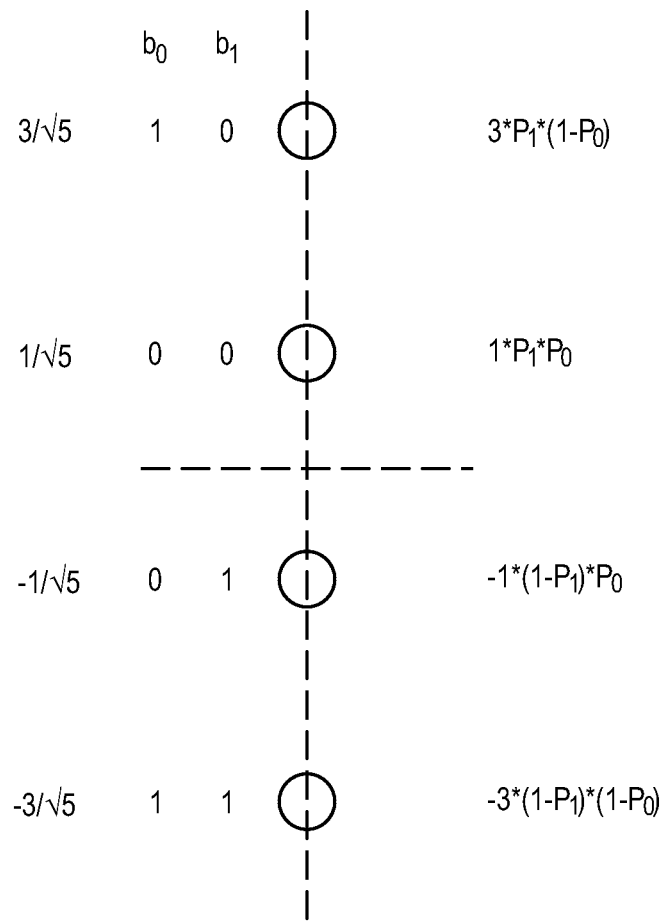
FIG. 6A schematically illustrates probability products contributing to a weighted superposition for estimating a modulated signal in a 4PAM modulation scheme.

Considering now the operation performed by the soft modulator of the interference regeneration circuitry according to the present technique, previously known Turbo-SIC and Turbo-PIC systems regenerate the interference by using a method of soft-remapping of bits to symbols that is based on a full superposition using a full set of the $Pe_b$ values, one for each bit of the coded message. For example, 4PAM modulation uses pairs of values: $P_{e2k}$, $P_{e2k+1}$. FIG. 6A schematically illustrates how for the simple case of 4PAM, each possible modulation symbol position (four possibilities in this case corresponding to the total of four possible permutations of two bits) is computed based upon the individual bit probabilities. This requires the accumulation of four products for each symbol (i.e. each regenerated modulation symbol) and the storage of each super-posed symbol as an N-bit value.

In FIG. 6A, $P_b$ is the probability that the hard decision for bit b is 0. This is obtained from the value of the hard decision and the per-bit error probability, $Pe_b$. Note that although only two symbols $b_o$ and $b_1$ corresponding to a two-bit pair mapped to a single 4PAM modulation signal, a received message may comprise, say 75,000 bits, 37500 of which correspond to $b_o$ values and 37,500 of which correspond to $b_1$ values. In this case there will be 75,000 values of the per-bit error probability $Pe_b$ (or soft decisions) to take into account and 37,500 of the probability products, four of which are illustrated on the right hand side of FIG. 6A.

In previously known implementations of soft remapping circuitry used for interference regeneration, taking for example the soft re-mapping for 4-PAM for WCDMA, each soft-symbol would be generated according to the following summation:

$$\hat{y}_n = \frac{3}{\sqrt{5}}(1-P_{2n})P_{2n+1} + \frac{1}{\sqrt{5}}P_{2n}P_{2n+1} - \frac{1}{\sqrt{5}}P_{2n}(1-P_{2n+1}) - \frac{3}{\sqrt{5}}(1-P_{2n})(1-P_{2n+1})$$

equation 1

Where n is the symbol number, 0 ... N−1, and $$P_m = \begin{cases} P_{em} & \text{for } LLR_m \geq 0 \\ 1 - P_{em} & \text{for } LLR_m < 0 \end{cases}$$

With $P_{em}$ determined for each LLR, m, by the equation below:

$$P_{em} = \frac{1}{1 + e^{|LLR_{em}|}}$$

This summation defining the remapped soft (modulation) symbol $\widehat{y_n}$ is the weighted superposition of all of the possible symbols that were transmitted. The total number of possible transmitted modulated symbols depends on the modulation scheme. 4-PAM is a WCDMA modulation scheme whereas QPSK, 16QAM and 64QAM are LTE modulation schemes.

Calculation of a full weighted superposition of all possible modulation states as prescribed by equation 1, which is implemented in previously known interference cancellation systems means that in those systems, all of the N-bit soft decisions (per-bit error probabilities $Pe_b$) would be used in calculations performed by the interleavers, the rate matchers and the soft modulators of the interference cancellation circuitry. However, according to the present technique, as illustrated by FIGS. 3 to 5, only single-bit hard decisions need be passed from the decoder to the subsequent modules (rate matcher, interleaver and soft modulator). This is possible because the combined values (described below), which are calculated by averaging or otherwise combining soft decisions corresponding to bits associated with different modulated symbols, are supplied to the soft modulator. These combined values are used instead of the full set of soft decisions for the coded message, so that for example, a mean value is used in substitution for some or all individual values contributing to that mean when considering the full weighted superposition calculation.

Note that the equation for $\widehat{y_n}$ above follows the usual grey-mapping (or Gray code mapping) of bits to symbols, as used in most wireless standards, but this is not a necessary condition. Gray coding helps to minimize bit errors by mapping the bits such that neighboring modulation symbols differ by only one bit. Also note that the √5 scaling (specific to 4PAM modulation) is a convention used to ensure unity mean power. The normalization performed may vary depending upon the modulation scheme implemented.

For higher-order alphabets such as 8PAM, or it's complex-numbered equivalent 64QAM, the number of products increases. The products and sums in the expression of equation 1 above need to be computed for each modulation symbol of the whole coded message.

The storage problem is exacerbated by the requirement for the re-ordering of the soft bits or symbols in various channel-interleavers and rate-matching buffers (as defined in the relevant 3G, 4G or WiMAX standards). In order to perform these operations, each APP LLR or bit probability $Pe_b$ or super-posed symbol requires buffering.

Figure 6B:
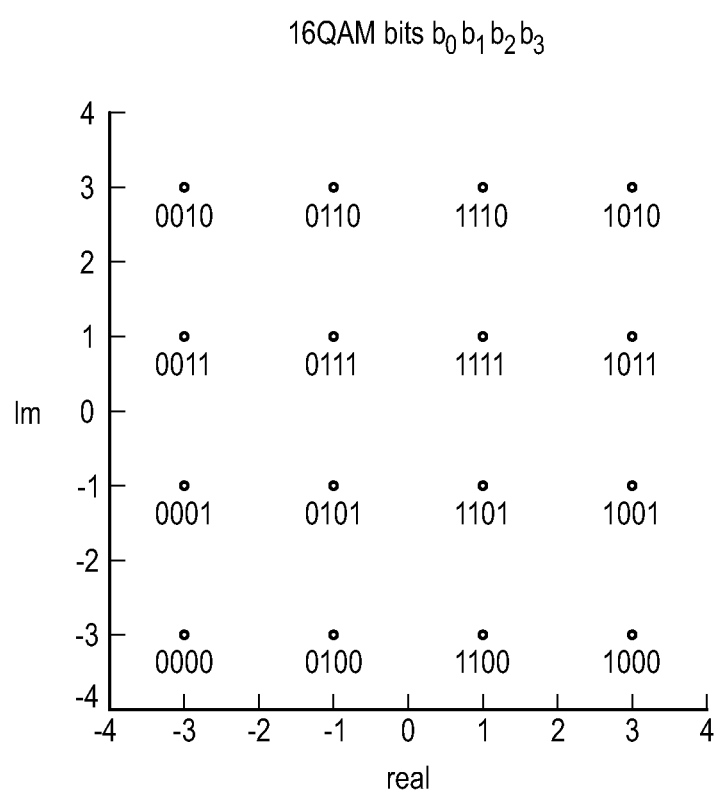
FIG. 6B schematically illustrates a 16 QAM (Quadrature Amplitude Modulation) constellation with Gray code mapping.

In case of 16QAM modulation, groups of four bits, are mapped to complex-valued modulation symbols x=I+jQ according to Table 1. FIG. 6B shows a 16QAM constellation with Gray code mapping. For 4PAM and QPSK there are two bits per modulation symbol, for 16QAM there are four bits per modulation symbol, for 64QAM there are six bits per modulation symbol.

TABLE 1

16 QAM modulation mapping.

| b0b1 | I  | b2b3 | Q  |
|------|----|------|----|
| 00   | −3 | 00   | −3 |
| 01   | −1 | 01   | −1 |
| 10   | +1 | 11   | +1 |
| 11   | +3 | 10   | +3 |

According to the present technique in the example of FIG. 6A, instead of using a full set of per-bit probabilities of error, $Pe_b$, combined values each constructed from a plurality of the per-bit probabilities of error selected from the full set are used together with the hard decisions to reconstruct an estimate for the transmitted modulated signal $\widehat{y_n}$. For example, the combined values could comprise mean values of the per-bit probabilities of error calculated according to the position of the bit within the modulation mapping. Thus, in the example of FIG. 6A and for a 75,000 bit coded message, a first mean value could be calculated by taking the mean value of all 37,500 per-bit error probabilities associated with $b_o$ and a second mean value could be calculated by taking the mean value of all 37,500 per-bit error probabilities associated with $b_1$. Analogously, in the case of 16 QAM, four mean values could be calculated, one for each of the four bit positions b0, b1, b2, b3 in the modulation mapping illustrated by FIG. 6B. Alternatively, different subsets of the per-bit probabilities could be combined by calculating an average, a weighted average, a sum, a normalized sum, a normalized weighted sum or some other alternative combination. Thus in the weighted superposition a mean value (or other combined value) is calculated to include per-bit probabilities of bits in the coded message that are known to be mapped to different modulation symbols. In one example: an average of per-bit probabilities all of the first bits of all sequences of M bits (in a coded message) mapped to a respective modulation symbol is taken; an average of all second bits of all sequences of M bits is taken; and so on, up to the total number of bits mapped to a modulation symbol in the modulation scheme.

Furthermore, the transmitted modulated signal could be estimated using only the systematic bits and their associated per-bit probabilities of error, disregarding at least some of the parity bits. Regenerating the transmitted modulated signal using only the systematic bits (ignoring parity bits such as parity-1 and parity-2 bits) is cheaper to implement and can provide reliable results, although it is likely to be less accurate than including both systematic and parity bits in the calculation. The number of parity bits transmitted can vary depending upon rate-matching parameters. This is due, for example, to a process called Incremental Redundancy-Hybrid Automatic Repeat Request IR-HARQ. IR-HARQ is a retransmission scheme, where if a decode ultimately fails, the same data is re-sent with different rate-matching parameters. In subsequent transmissions, more parity than systematic bits may be sent.

First Simplified Weighted Superposition Method

The complexity of the super-posed symbol computation of equation 1 above (representing an estimate of a reconstructed modulated signal) and the storage requirements can be reduced according to the present technique by using the steps of a first simplified weighted superposition method described below:

1) Use hard-decisions (the numerical signs, which are 1-bit values) of the APP LLRs for interference regeneration.
2) Apply rate-matching to these APP LLR hard-decisions (1-bit values) in a reduced memory size buffer.
3) In the case of BPSK, take the mean value of $Pe_b$ (these can be systematic bits only, or rate-matched systematic, parity-1 and parity-2 bits in the 3GPP case).
4) In the 4PAM case (which maps two bits per modulation symbol), take two means of $Pe_b$: the mean of the even-numbered indexes and the mean of the odd-numbered indexes
5) In the 8PAM case (which maps three bits per modulation symbol), take three means of $Pe_b$: the mean of indexes, 0, 3, 6, 9, . . . ; the mean of indexes 1, 4, 7, 10, . . . ; and the mean of indexes 2, 5, 8, 11, . . . .
6) This principle can be extended for any modulation and is not limited to 4PAM or 8PAM.
7) Discard the APP LLRs—they do not need to be stored.
8) Apply a mean-weighted superposition to the hard-decisions. This is done according to FIG. 6A, but now there are only four products to compute for the entire sequence of modulated symbols because there is one value of mean probability for each of the two bit-positions (b0 and b1) in the mapping of two bits to a modulation symbol (4PAM) and these same two mean values are used for every bit pair of the coded message.

The numbered steps above may occur in a different order than above and one or more steps may be omitted according to alternative embodiments.

For this first simplified weighted superposition method, the regenerated modulated transmitted signal corresponding to the previously known full weighted superposition method, calculated according to equation 1, can instead be calculated according to the following simplified equations:

For hard decisions b0=0, b1=0:

$$S_{00} = \frac{3}{\sqrt{5}}(1 - P_{even})P_{odd} + \frac{1}{\sqrt{5}}P_{even}P_{odd} - \frac{1}{\sqrt{5}}P_{even}(1 - P_{odd}) - \frac{3}{\sqrt{5}}(1 - P_{even})(1 - P_{odd})$$ [eqn. 2a]

For hard decisions b0=0, b1=1:

$$S_{01} = \frac{3}{\sqrt{5}}(1 - P_{even})(1 - P_{odd}) + \frac{1}{\sqrt{5}}P_{even}(1 - P_{odd}) - \frac{1}{\sqrt{5}}P_{even}P_{odd} - \frac{3}{\sqrt{5}}(1 - P_{even})P_{odd}$$ [eqn. 2b]

For hard decisions b0=1, b1=0:

$$S_{10} = \frac{3}{\sqrt{5}}P_{even}P_{odd} + \frac{1}{\sqrt{5}}(1 - P_{even})P_{odd} - \frac{1}{\sqrt{5}}(1 - P_{even})(1 - P_{odd}) - \frac{3}{\sqrt{5}}P_{even}(1 - P_{odd})$$ [eqn. 2c]

For hard decisions b0=1, b1=1:

$$S_{11} = \frac{3}{\sqrt{5}} P_{even}(1 - P_{odd}) + \frac{1}{\sqrt{5}}(1 - P_{even})(1 - P_{odd}) - \quad \text{[eqn. 2d]}$$
$$\frac{1}{\sqrt{5}}(1 - P_{even})P_{odd} - \frac{3}{\sqrt{5}} P_{even} P_{odd}$$

$$\hat{y}_n = \begin{cases} S_{00} & \text{if } \hat{b}_{2n}, \hat{b}_{2n+1} = 0, 0 \\ S_{01} & \text{if } \hat{b}_{2n}, \hat{b}_{2n+1} = 0, 1 \\ S_{10} & \text{if } \hat{b}_{2n}, \hat{b}_{2n+1} = 1, 0 \\ S_{11} & \text{if } \hat{b}_{2n}, \hat{b}_{2n+1} = 1, 1 \end{cases}$$

Where $\hat{b}_i$ represents the hard decisions and where $P_{even}$ and $P_{odd}$ are the single mean values of the probability of bit error for the even and odd numbered bits ($b_0$ and $b_1$) in the modulation symbol respectively.

Second Simplified Weighted Superposition Method

In this alternative method according to the present technique, the proposal is that the weighted superposition is simplified even further by taking a single mean of all the per-bit error probabilities, rather than taking a mean value for each individual bit-position (b0, b1, . . . etc) in the modulation mapping. In particular, where a single mean per-bit probability of error is used the estimate of the modulated transmitted signal can be calculated according to the following steps, where (similarly to the first method above) the modulated symbol depends upon the hard decisions output by the per-bit decoder.
1) Use hard-decisions (the numerical signs, which are 1-bit values) of the APP LLRs for interference regeneration
2) Apply rate-matching to these APP LLR hard-decisions (1-bit values) in a reduced memory size buffer.
3) Take the mean value of $Pe_b$ (these can be systematic bits only, or rate-matched systematic, parity-1 and parity-2 bits in the 3GPP case).
4) This principle can be extended for any modulation and is not limited to 4PAM or 8PAM.
5) Discard the APP LLRs—they do not need to be stored.
6) Apply a mean-weighted superposition to the hard-decisions. This is done according to FIG. 6A (for the case of 4PAM) but now there are only four products to compute for the entire sequence of modulated symbols in the coded message.

The numbered steps above may occur in a different order than above and one or more steps may be omitted according to alternative embodiments.

In this case, regeneration of the transmitted modulated signal is calculated according to the following equation, using a single combined probability value $P_e$.

In this second weighted superposition method according to the present technique, the proposal is that the weighted superposition is simplified further:

For hard decisions b0=0, b1=0:

$$S_{00} = \frac{3}{\sqrt{5}}(1 - P_e)P_e + \frac{1}{\sqrt{5}} P_e P_e - \quad \text{[eqn. 3a]}$$
$$\frac{1}{\sqrt{5}} P_e(1 - P_e) - \frac{3}{\sqrt{5}}(1 - P_e)(1 - P_e)$$

For hard decisions b0=0, b1=1:

$$S_{01} = \frac{3}{\sqrt{5}}(1 - P_e)(1 - P_e) + \quad \text{[eqn. 3b]}$$
$$\frac{1}{\sqrt{5}} P_e(1 - P_e) - \frac{1}{\sqrt{5}} P_e P_e - \frac{3}{\sqrt{5}}(1 - P_e)P_e$$

For hard decisions b0=1, b1=0:

$$S_{10} = \frac{3}{\sqrt{5}} P_e P_e + \frac{1}{\sqrt{5}}(1 - P_e)P_e - \quad \text{[eqn. 3c]}$$
$$\frac{1}{\sqrt{5}}(1 - P_e)(1 - P_e) - \frac{3}{\sqrt{5}} P_e(1 - P_e)$$

For hard decisions b0=1, b1=1:

$$S_{11} = \frac{3}{\sqrt{5}} P_e(1 - P_e) + \quad \text{[eqn. 3d]}$$
$$\frac{1}{\sqrt{5}}(1 - P_e)(1 - P_e) - \frac{1}{\sqrt{5}}(1 - P_e)P_e - \frac{3}{\sqrt{5}} P_e P_e$$

$$\hat{y}_n = \begin{cases} S_{00} & \text{if } \hat{b}_{2n}, \hat{b}_{2n+1} = 0, 0 \\ S_{01} & \text{if } \hat{b}_{2n}, \hat{b}_{2n+1} = 0, 1 \\ S_{10} & \text{if } \hat{b}_{2n}, \hat{b}_{2n+1} = 1, 0 \\ S_{11} & \text{if } \hat{b}_{2n}, \hat{b}_{2n+1} = 1, 1 \end{cases}$$

Where $\hat{b}_i$ represent the hard decisions and where $P_e$ is the single mean value of the probability of bit error.

The interference cancellation circuitry and decoding circuitry according to the embodiments of FIGS. 3, 4 and 5 implement calculation of the N-bit mean values in the turbo decoder and these are supplied from the turbo decoder to the soft modulator, allowing one-bit hard decisions instead of N-bit soft decisions to be sent from the decoder to the rate matcher (FIGS. 4 and 5), the interleaver and the soft modulator as shown. However, calculation of the N-bit means can be performed either before or after the rate matching or before or after the interleaving is performed. For example, the combined values (N-bit means) in some embodiments are calculated using software in the soft modulator.

One advantage of calculating the N-bit means in the decoder is that the soft decisions can be discarded sooner in the interference cancelling process chain, i.e., they are not required by the rate matching or the interleaving. This means that there is more of a reduction in buffering requirements because there is no need for soft decision storage in the interleaver or rate matching module. However, there are also advantages associated with calculating the average after the rate matching or after the interleaving, because this means that the combined values (e.g. averages) are calculated across the same set of bits as used for the reconstruction of the transmitted modulated signal, potentially making the average probabilities thus calculated a better measure.

Figure 7:
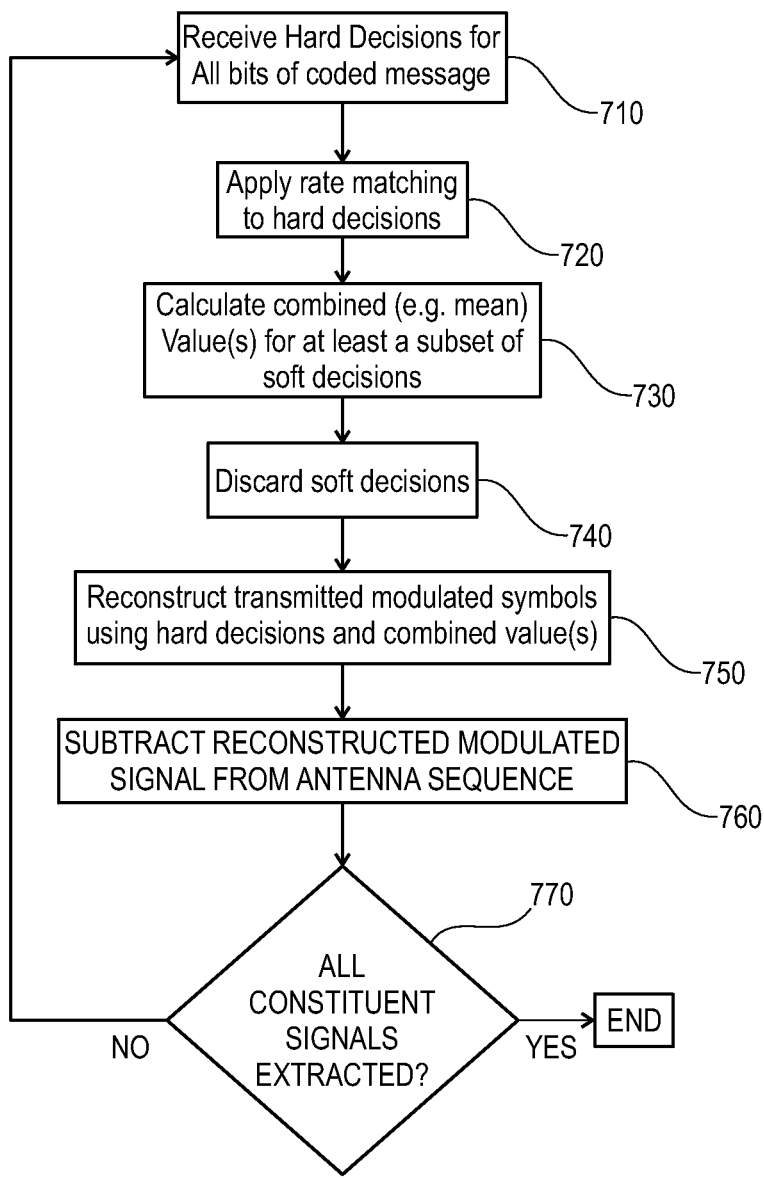
FIG. 7 is a flow chart schematically illustrating an interference cancellation process involving calculation of combined values from per-bit probabilities.

FIG. 7 is a flow chart schematically illustrating general principles of the method according to the simplified weighted superposition according to the present technique. At process element 710, the interference cancellation circuitry receives, from a per-bit decoder, hard decisions for bits of a coded message comprising systematic bits and parity bits. The hard decisions can be calculated from numerical signs of the APP LLRs generated for each coded bit by the decoder. At process element 720, there is an optional step of applying rate matching (if required) to the hard decisions to puncture and/or repeat values of the coded message.

At process element 730, a calculation of at least one combined value is performed. This involves combining multi-bit soft decisions corresponding to the per-bit probability of error for different bits of the coded message to form a combined value. The combined values or "composite" probability values are used to reduce the complexity of a full weighted superposition conventionally used to regenerate a transmitted modulated signal by reducing the number of variables that are used in the weighted superposition. For example, in one embodiment, the combined values comprise a plurality of mean values corresponding respectively to each of a plurality of bit-positions (i=0, 1 . . . M) in the mapping of M-bits to a given modulation symbol in a relevant modulation scheme. Thus it will be apparent that the combined value incorporates soft decisions (per-bit probabilities) associated with bits that are mapped to different modulation symbols. By way of contrast, the products of per-bit errors listed in FIG. 6A for each possible hard decision combine only soft decisions $P_1$ and $P_0$ corresponding to bits of the coded message that are mapped to the same given modulation symbol. The combined values according to the present technique are used to replace the individual bit-error probabilities corresponding to individual bits of the coded message such that the mean value is used (replicated) in the weighted sum where each of the values contributing to that mean value would otherwise have been used in the full weighted sum. Thus, for example, there are two mean values for 4PAM (two bits per symbol) and four mean values for 16QAM (four bits per symbol). Calculation of the combined values can be calculated after decoding, but whether before or after rate matching and before or after interleaving. In some embodiments a mean or average value is taken of per-bit probabilities of error across all bits of the coded message rather than calculating separate means corresponding to different positions of the given bit of the coded message (e.g. different positions b0 and b1 in FIG. 6A) within an M-bit sequence of bits that are mapped to a single modulation symbol.

In some embodiments a superposition of all possible K modulated states is performed. Alternatively, the weighted superposition could include, instead of a superposition of all possible K modulated states allowed by a given modulation scheme, a superposition of a subset of, e.g., a number (less than K) of most likely modulated states only. In some embodiments, only the systematic bits are included in the weighted superposition. In other embodiments both parity bits and systematic bits are included. The present technique is not limited to calculation of a mean value of the combined/composite soft decisions. Instead, for example, a weighted mean or a different normalized weighted sum could be used. In one implementation of the weighted sum, all of the weights are identical.

At process element 740, after all of the combined values required for calculation of the weighted superposition have been computed, at least a portion of the per-bit probabilities (soft decisions) generated by the decoder can be discarded to reduce buffering requirements. The simplification of the weighted superposition according to the present technique saves on memory in apparatus modules such as the soft modulator, the interleaver and the rate matcher of the interference cancellation circuitry and also reduces chip area and power consumption by reducing the number of calculations required to regenerate the transmitted modulated signal. The throughput may be increased or transmit operations may occur at a reduced power level. For example, the same throughput may be achieved with half of the transmit power.

At process element 750, estimates of the transmitted modulated symbols are calculated by performing a weighted superposition using hard decisions from the decoder and the one or more combined values calculated in process element 730. The weighted superposition involves superposing at least a subset of all possible modulation states and uses at least a subset of bits (systematic bits and parity bits) of the coded message. After regeneration of an estimated modulated signal corresponding to one user, the regenerated signal is subtracted from the antenna sequence at stage 760 and then at process element 770 it is determined whether or not all constituent signals have been extracted. If there are further signals still to be extracted then the process returns to process element 710 where the process is repeated to estimate the transmitted modulated signal corresponding to a different user or corresponding to a different data channel associated with the same user (SU-MIMO). Otherwise, if all signals have been extracted at process element 770, the process ends. In this example, the interference cancellation is performed successively for each user, rather than in parallel.

Figure 8:
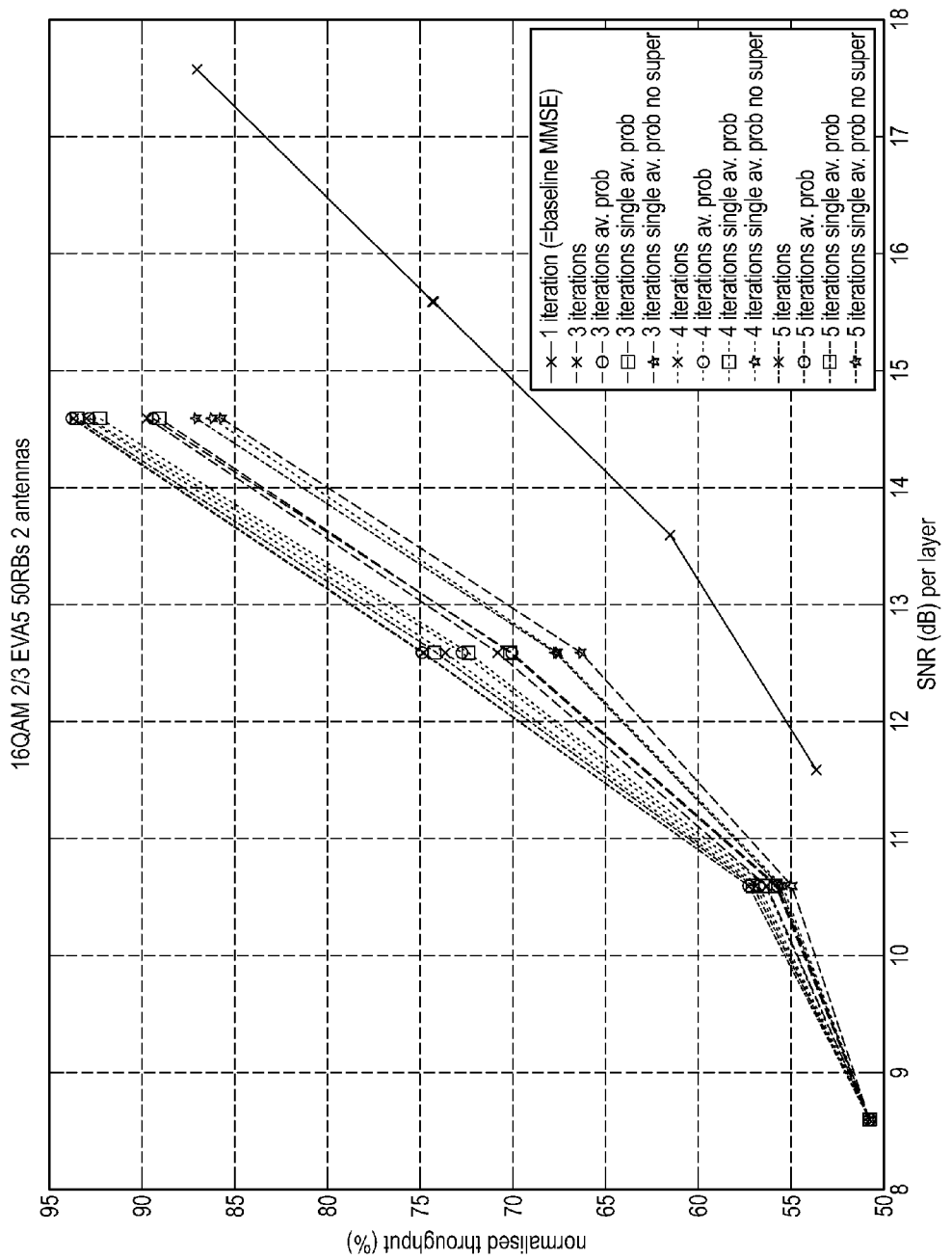
FIG. 8 schematically illustrates simulated performance of simplified weighted hard decision superposition according to the present technique.

FIG. 8 schematically illustrates simulated performance of the simplified weighted hard decision superposition according to the present technique in a 4G LTE wireless communication system. The results show that the simplified weighted superposition method that replaces some per-bit error probabilities with combined values shows negligible performance degradation relative to the previously known fully weighted superposition, which uses a full set of soft decisions for the coded message.

The embodiment described above as the first simplified weighted superposition method and as specified by equations [2a] to [2d] corresponds to the data points and graph lines labeled as "N-Iterations av. Prob" in FIG. 8. The second simplified weighted superposition method specified by equations [3a] to [3d] above effectively treats all modulations as in the BPSK case leading to the production of a single mean value ($P_0=P_1$ in the FIG. 6 4PAM example). This is described as "N-Iterations Single av. Prob" in the graph of FIG. 8. The previously known full superposition method is labeled "N-iterations" in the graph of FIG. 8. Although the previously known full weighted superposition method can be seen from FIG. 8 to offer slightly better throughput performance for a given Signal to Noise Ratio (SNR) on the x-axis, the difference is very small. The advantages in terms of reduced complexity of the calculation and reduced memory requirements for the interference cancellation circuitry according to the present technique are clear.

In LTE a Physical Resource Block (PRB) comprises 12 subcarriers by 7 OFDM symbols=84 modulation symbols. A resource block comprises two PRBs=2×84=168 modulation symbols per subframe. However, taking into account symbols used for control channels and reference signals there are approximately 144 usable modulation symbols per subframe (or resource block). The number of bits of a coded message mapped to each modulation symbol depends upon the modulation scheme. BPSK maps one bit per modulation symbol; 4PAM maps two bits per modulation symbol; 16 QAM maps four bits per modulation symbols; and 64 QAM maps 6 bits per modulation symbol. For a modulation scheme that maps M-bits to a modulation symbol the total number of possible modulation states is $2^M$. The weightings, "$n_{weights}$" contributing to the weighted superposition $$\left(\text{e.g. } \frac{1}{\sqrt{5}}, \frac{3}{\sqrt{5}}, -\frac{1}{\sqrt{5}}, -\frac{3}{\sqrt{5}}\right)$$

may also be taken into account regarding the number of products. Considering the available reduction in numerical complexity, the number of products required to perform the "full superposition" method for a given resource-block allocation, $N_{RB}$, is:

$n_{weights} \times 1 \times 144 \times N_{RB}$ for BPSK.

$n_{weights} \times 4 \times 144 \times N_{RB}$ for 4PAM/QPSK $n_{weights} \times 8 \times 144 \times N_{RB}$ for 4PAM $n_{weights} \times 16 \times 144 \times N_{RB}$ for 16QAM.

$n_{weights} \times 64 \times 144 \times N_{RB}$ for 64QAM.

According to the present technique, the number of product terms required to compute all possible values for each modulation symbol is M, where the number of constellation points in the constellation is $2^M$. Each product term will also require M products in total, but each term $S_{00}$, $S_{10}$, ... etc (see equation 3[d] for example) may have common terms. In particular, the number of products required to perform the first simplified weighted superposition method according to the present technique (one average of soft decisions being calculated per bit position of the modulation mapping) is:
0 products for BPSK (i.e. $P_e$ or $P_o$ only);
4 product terms with one product each for 4PAM or QPSK (i.e. these are $P_{even}P_{odd}$, $(1-P_{even})P_{odd}$, $(1-P_{even})(1-P_{odd})$ and $P_{even}(1-P_{odd})$);
8 product terms with 2 products each for 8PAM;
16 product terms with 3 products each for 16 QAM; and
64 product terms with 5 products each for 64QAM;
When the modulation scheme weightings are taken into account then the number of products increases to:
2 products for BPSK $4_{points} \times 2_{scale} \times 1_{*operations} = 8$ products for 4PAM $8_{points} \times 4_{scales} \times 2_{*operations} = 64$ products for 8 PAM $2_{real\text{-}imag} \times 4_{points} \times 2_{scales} \times 1_{*operations} = 16$ products for 16 QAM $2_{real\text{-}imag} \times 8_{points} \times 4_{scales} \times 2_{*operations} = 128$ products for 64 QAM Where, in the above, a "*operation" means the multiply in: $p_e * p_o$, etc.

According to the present technique these products need only be computed once and then looked-up from a look-up table according to the hard-decision values. So this would be 144 look-ups per resource-block instead of 144 calculations based upon individual per-bit error probabilities. Furthermore, the number of resource block becomes irrelevant via use of the mean values. The mean values are calculated, for example, to incorporate at least a subset of bits in a coded message, the coded message typically comprising a plurality of resource blocks.

The number of products required to perform the second simplified weighted superposition method according to the present technique (single average/mean value comprising all of the relevant soft decisions) is:
1 for BPSK, 4PAM, 16QAM and 64QAM Considering the reduction in hardware storage requirement achievable using the present technique, the smallest hardware storage require for the previously known "full superposition" method for a given resource-block allocation, $N_{RB}$, and $N_{bit}$ representation of $Pe_b$ is:

$2 \times 144 \times N_{bits} \times N_{RB}$ for BPSK $8 \times 144 \times N_{bits} \times N_{RB}$ for 4PAM $64 \times 144 \times N_{bits} \times N_{RB}$ for 4PAM $16 \times 144 \times N_{bits} \times N_{RB}$ for QAM16

$128 \times 144 \times N_{bits} \times N_{RB}$ for QAM64

Typically, $N_{bit}$ will be 8 for Turbo-SIC operation using "full superposition".

By way of contrast for both the first simplified weighted superposition method and the second simplified weighted superposition method according to the present technique, $N_{bit}$ will always be 1. These calculations of potential reductions in required storage capacity and the required number of calculations are examples only. The skilled person will appreciate the efficiencies gained by using mean values repeatedly in the superposition calculation rather than the individual per-bit probability values in the full weighted superposition method.

Implementation of the simplified weighted superposition method according to the present technique potentially allows some hardware reuse, resulting in reduced implementation costs. In particular, the application of reverse rate-matching to the APP LLR hard-decisions (1-bit values) for the re-estimation of interference in the receiver allows potential re-use of hardware in the transmitter for rate-matching which is designed to operate on bits.

Although the embodiments described above implement the regeneration of a modulated transmitted signal in a receiver using 4G LTE nomenclature, it will be appreciated that the present technique can also be applied to 3G WCDMA/HSPA as well as WiMAX and other wireless standards that use APP LLR based equalisations.

Figure 9:
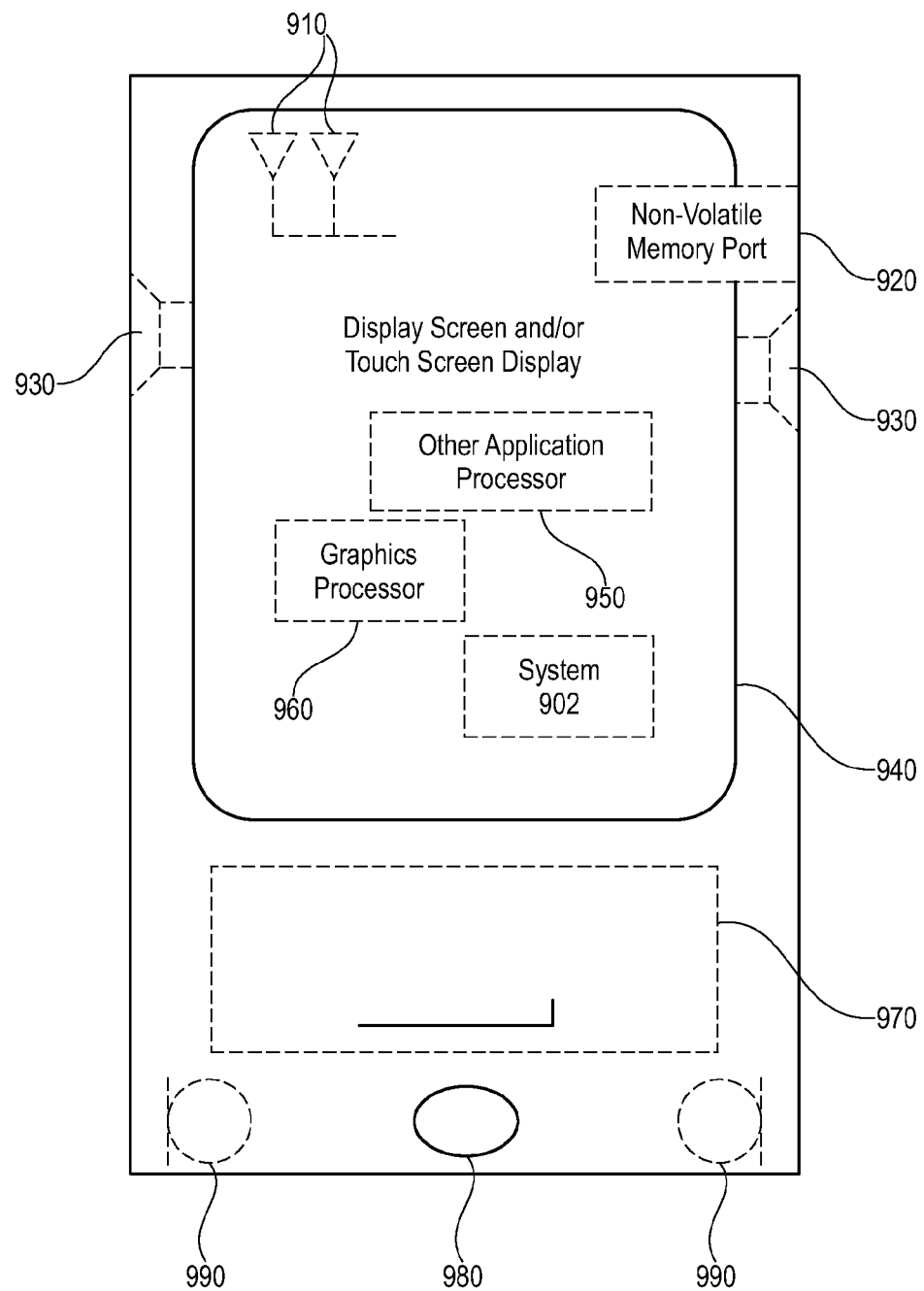
FIG. 9 schematically illustrates a wireless device.

FIG. 9 provides an example illustration of a wireless device 900, such as user equipment (UE), a mobile station (MS), a mobile wireless device, a mobile communication device, a tablet, a handset, or other type of wireless device. The wireless device can include one or more antennas 910 configured to communicate with a node, macro node, low power node (LPN), or, transmission station, such as a base station (BS), an evolved Node B (eNB), a baseband unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP LTE, WiMAX, High Speed Packet Access (HSPA), Bluetooth, and Wi-Fi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

The wireless device 900 of FIG. 9 also provides an illustration of a microphone 990 and one or more speakers 930 that can be used for audio input and output from the wireless device. The device comprises multiple antennas

910. The antennas 910 connect to an analog front end, which is in communication with a transmitter and a receiver or a single transceiver. The display screen 940 may be a liquid crystal display (LCD) screen, or other type of display screen such as an organic light emitting diode (OLED) display. The display screen 940 can be configured as a touch screen. The touch screen may use capacitive, resistive, or another type of touch screen technology. An application processor 950 and a graphics processor 960 can be coupled to internal memory to provide processing and display capabilities. The application processor 950 may comprise a Digital Signal Processor (DSP) or an Application Specific Integrated Circuit (ASIC). A non-volatile memory port 920 can also be used to provide data input/output options to a user. The non-volatile memory port 920 may also be used to expand the memory capabilities of the wireless device. A keyboard 970 may be integrated with the wireless device or wirelessly connected to the wireless device to provide additional user input. A virtual keyboard may also be provided using the touch screen. The wireless device 900 comprises a system 902 corresponding to the decode and interference cancellation system according to the present technique, as illustrated, for example by any one of FIGS. 3 to 5.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium such that when the program code is loaded into and executed by a machine, such as a computer, the machine becomes an apparatus for practicing the various techniques according to the above described embodiments. In the case of program code execution on programmable devices such as a UE or a wireless device, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data.

One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that where the functional units described in this specification have been labeled as modules, this is to highlight their implementation independence. Note that a module may be implemented, for example, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Where functional units have been described as circuitry, the circuitry may be general purpose processor circuitry configured by program code to perform specified processing functions. The circuitry may also be configured by modification to the processing hardware. Configuration of the circuitry to perform a specified function may be entirely in hardware, entirely in software or using a combination of hardware modification and software execution. Program instructions may be used to configure logic gates of general purpose or special-purpose processor circuitry to perform a processing function.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

EXAMPLES

Example 1 is interference cancellation circuitry for reconstructing a wirelessly transmitted modulated signal in a receiver using output of a decoder for calculating per-bit probabilities corresponding to bit-by-bit estimates of a coded message, the decoder being configured to calculate, a single-bit hard decision and a multi-bit soft decision for at least a subset of the bit-by-bit estimates, the hard decision representing a binary value for the bit of the coded message and the soft decision representing a probability that the corresponding hard decision for the bit is correct, the circuitry comprising:
- a soft modulator configured to modulate the bit-by-bit estimates of the coded message generated by the decoder and to reconstruct the transmitted modulated signal from a weighted superposition of a plurality of possible modulated states, the weighted superposition depending upon the hard decisions and at least one combined value, the combined value being calculated by combining a plurality of the multi-bit soft decisions corresponding to different bits of the coded message mapped to different modulation symbols, the at least one combined value being reused in calculation of a plurality of different reconstructed modulated symbols.

Example 2 may be the subject-matter of Example 1, wherein the at least one combined value comprises one of: a mean value, a weighted mean value, a normalized sum and a weighted normalized sum of at least a subset of the set of multi-bit soft decisions for bits of the coded message.

Example 3 may be the subject matter of Example 1, wherein the coded message comprises systematic bits and parity bits and wherein the reconstruction of the transmitted modulated signal uses the multi-bit soft decisions of at least a subset of the systematic bits, disregarding multi-bit soft decisions for at least some of the parity bits.

Example 4 may be the subject matter of Example 1, wherein the soft modulator is configured to calculate the weighted superposition depending upon the hard decision and the soft decision as obtained from A-posteriori Probability Log Likelihood Ratios (APP LLRs) corresponding to bit-by-bit estimates of the coded message.

Example 5 may be the subject matter of Example 1, wherein a modulation scheme used to modulate the coded message prior to transmission encodes M-bits per modulation symbol and wherein the soft modulator is configured to reconstruct the transmitted modulated signal by calculating a weighted superposition of at least a subset of all possible transmitted $2^M$ modulation states.

Example 6 may be the subject matter of Example 1, wherein at least one of the combined value(s) used by the soft modulator in the weighted superposition is calculated using multi-bit soft decisions corresponding specifically to a particular one of the M bit-positions within the M-bits mapped to a given modulated symbol at the transmitter.

Example 7 may be the subject matter of Example 5, wherein the modulation scheme is one of BPSK, QPSK, 16QAM and 64 QAM and wherein the number of combined values calculated for use in the weighted superposition are one, two, four and six respectively, corresponding to the number of bits mapped to a modulation symbol in the respective modulation scheme.

Example 8 may be the subject matter of Example 1, comprising rate matching circuitry configured to perform rate matching by modifying an output of the decoder to disregard or repeat a subset of the per-bit estimates of the coded message and wherein the rate matching is performed one of: before calculation of the at least one combined value(s) and after calculation of the at least one combined value(s).

Example 9 may be the subject matter of Example 8, comprising an interleaver configured to receive rate matched output of the rate matching circuitry, to perform interleaving on the rate matched output bits and to supply the interleaved rate matched output to the soft modulator and wherein the rate matching is performed one of: before calculation of the at least one combined value(s) and after calculation of the at least one combined value(s).

Example 10 may be the subject matter of Example 1, wherein at least a subset of the multi-bit soft decisions for bits of the coded message are discarded by the interference calculation circuitry following calculation of the at least one combined value.

Example 11 is a base station subsystem comprising the interference cancellation circuitry of Example 1.

Example 12 is a User Equipment for use in a wireless communications network, the User Equipment comprising:
- a per-bit decoder for calculating bit-by-bit probabilities of a coded message, the decoder being configured to calculate hard decisions representing final decoded bits and a respective plurality of per-bit probabilities indicating a level of confidence in the corresponding hard decision, wherein the per-bit probabilities are N-bit values where N is an integer greater than one;
- soft modulation circuitry configured to regenerate a transmitted modulated signal corresponding to the coded message by forming a weighted sum of at least a subset of possible modulated states of a modulation scheme used by a transmitter of the coded message, the weighted sum depending upon the hard decisions and a composite probability comprising a normalized weighted sum of at least two of the per-bit probabilities corresponding to different bits of the coded message, such that the composite probability comprises per-bit probabilities of bits of the coded message that are mapped to different modulation symbols, the at least one composite probability being reused in calculation of a plurality of different regenerated modulated symbols;
- interference cancellation circuitry for subtracting the regenerated modulated signal from a received signal in which a plurality of distinct signals have been allocated the same time and frequency resources on a wireless communication channel, the subtraction being performed between iterations of the interference cancellation circuitry.

Example 13 may be the subject matter of Example 12, wherein the per-bit decoder is one of a turbo decoder, a Low Density Parity Check decoder and a Viterbi decoder.

Example 14 is a method of performing interference cancellation in a wireless communication system, the method comprising:
- decoding a coded message to generate hard decisions and per-bit probabilities for bits of the coded message, the per-bit probabilities representing a probability that the hard decision of the decoder for a given bit is correct;
- calculating an estimate of a transmitted modulated signal for the coded message using a weighted a sum of at least a subset of possible modulation states, the weighted sum depending upon a modulation scheme used by the transmitter, at least a subset of the hard decisions and at least one combined per-bit probability calculated by selectively combining at least one subset of per-bit probabilities from a set comprising a per-bit probability for each bit of the coded message and wherein the selected subset of per-bit probabilities correspond to bits of the coded message mapped to more than one modulation symbol and wherein the at least one combined per-bit probability is used more than once in calculation of a given weighted sum;

using the estimate of the transmitted modulated signal to cancel interference in a received signal.

Example 16 may be the subject matter of Example 14, wherein the combined per-bit probability comprises a single value combining all of the per-bit probabilities corresponding to bits of the coded message contributing to the weighted sum.

Example 16 is a computer program product embodied on a non-transitory computer-readable medium comprising program instructions configured such that when executed by processing circuitry cause the processing circuitry to implement the method of Example 14.

Example 17 is means for interference cancellation for reconstructing a wirelessly transmitted modulated signal in a receiver using output of a decoder for calculating per-bit probabilities corresponding to bit-by-bit estimates of a coded message, the decoder being configured to calculate, a single-bit hard decision and a multi-bit soft decision for at least a subset of the bit-by-bit estimates, the hard decision representing a binary value for the bit of the coded message and the soft decision representing a probability that the corresponding hard decision for the bit is correct, the circuitry comprising:

means for soft modulation configured to modulate the bit-by-bit estimates of the coded message generated by the decoder and to reconstruct the transmitted modulated signal from a weighted superposition of a plurality of possible modulated states, the weighted superposition depending upon the hard decisions and at least one combined value, the combined value being calculated by combining a plurality of the multi-bit soft decisions corresponding to different bits of the coded message mapped to different modulation symbols, the at least one combined value being reused in calculation of a plurality of different reconstructed modulated symbols.

Example 18 is a method for processing a signal based on super-posed symbol computation comprising:

performing interference regeneration using hard-decisions (the numerical signs, which are 1-bit values) of the A-Posteriori Probability of Log Likelihood Ratios;

applying rate-matching to these A-Posteriori Probability of Log Likelihood Ratios hard-decisions (1-bit values) in a reduced memory size buffer;

for BPSK environments, determining or obtaining the mean value of $Pe_b$, where the $Pe_b$ is the bit probability of error which can be systematic bits only, or rate-matched systematic, parity-1 and parity-2 bits, in the 3GPP case;

for a 4PAM environment, determining or obtaining two means of $Pe_b$ which are the mean of the even-numbered indexes and the mean of the odd-numbered indexes;

for a 8PAM environment, determining or obtaining three means of $Pe_b$ which are mean of indexes, 0, 3, 6, 9, . . . , the mean of indexes 1, 4, 7, 10, . . . , and the mean of indexes 2, 5, 8, 11, . . . ;

discarding the A-Posteriori Probability of Log Likelihood Ratios; and applying a mean-weighted superposition to the hard-decisions resulting in the computation of four products to compute for the sequence of modulated symbols.

The invention claimed is:

1. Interference cancellation circuitry for reconstructing a wirelessly transmitted modulated signal in a receiver using output of a decoder for calculating per-bit probabilities corresponding to bit-by-bit estimates of a coded message, the decoder being configured to calculate, single-bit hard decisions and multi-bit soft decisions for at least a subset of the bit-by-bit estimates, the each of the hard decisions representing a binary value for the bit of the coded message and each of the soft decision representing a probability that the corresponding one of the hard decisions for the bit is correct, the circuitry comprising:

a soft modulator configured to:
  receive a plurality of the multi-bit soft decisions corresponding to different bits of the coded message mapped to different modulation symbols from the decoder;
  combine the plurality of the multi-bit soft decisions to calculate at least one combined value, the plurality of the multi-bit soft decisions being less than a set of multi-bit soft decisions for bits of the coded message;
  receive the hard decisions from decoder;
  calculate a weighted superposition of a plurality of possible modulated states based on the received hard decisions and the at least one combined value;
  modulate the bit-by-bit estimates of the coded message generated by the decoder; and
  reconstruct the transmitted modulated signal from the weighted superposition of the plurality of possible modulated states, wherein the at least one combined value is reused in calculation of a plurality of different reconstructed modulated symbols.

2. The interference cancellation circuitry of claim 1, wherein the at least one combined value comprises one of: a mean value, a weighted mean value, a normalized sum and a weighted normalized sum of at least a subset of the set of multi-bit soft decisions for bits of the coded message.

3. The interference cancellation circuitry of claim 1, wherein the coded message comprises systematic bits and parity bits and wherein the reconstruction of the transmitted modulated signal uses the multi-bit soft decisions of at least a subset of the systematic bits, disregarding multi-bit soft decisions for at least some of the parity bits.

4. The interference cancellation circuitry of claim 1, wherein the soft modulator is configured to calculate the weighted superposition depending upon the hard decision and the soft decision as obtained from A-posteriori Probability Log Likelihood Ratios (APP LLRs) corresponding to bit-by-bit estimates of the coded message.

5. The interference calculation circuitry of claim 1, wherein a modulation scheme used to modulate the coded message prior to transmission encodes M-bits per modulation symbol and wherein the soft modulator is configured to reconstruct the transmitted modulated signal by calculating a weighted superposition of at least a subset of all possible transmitted $2^M$ modulation states.

6. The interference calculation circuitry of claim 5, wherein at least one of the combined values used by the soft modulator in the weighted superposition is calculated using multi-bit soft decisions corresponding specifically to a particular one of the M bit-positions within the M-bits mapped to a given modulated symbol at the transmitter.

7. The interference calculation circuitry of claim 5, wherein the modulation scheme is one of BPSK, QPSK, 16QAM and 64 QAM and wherein the number of combined values calculated for use in the weighted superposition are one, two, four and six respectively, corresponding to the number of bits mapped to a modulation symbol in the respective modulation scheme.

8. The interference calculation circuitry of claim 1, comprising rate matching circuitry configured to perform rate matching by modifying an output of the decoder to disregard or repeat a subset of the per-bit estimates of the coded message and wherein the rate matching is performed one of: before calculation of the at least one combined values and after calculation of the at least one combined values.

9. The interference calculation circuitry of claim 8, comprising an interleaver configured to receive rate matched output of the rate matching circuitry, to perform interleaving on the rate matched output bits and to supply the interleaved rate matched output to the soft modulator and wherein the rate matching is performed one of: before calculation of the at least one combined values and after calculation of the at least one combined values.

10. The interference calculation circuitry of claim 1, wherein at least a subset of the multi-bit soft decisions for bits of the coded message are discarded by the interference calculation circuitry following calculation of the at least one combined value.

11. A base station subsystem comprising the interference cancellation circuitry of claim 1.

12. The interference cancellation circuitry of claim 1, wherein soft modulator is configured to directly receive the plurality of the multi-bit soft decisions from the decoder.

13. The interference cancellation circuitry of claim 12, wherein soft modulator is configured to receive the hard decisions from decoder via an interleaver.

14. A User Equipment for use in a wireless communications network, the User Equipment comprising:
   a per-bit decoder for calculating bit-by-bit probabilities of a coded message, the decoder being configured to calculate hard decisions representing final decoded bits and a respective plurality of per-bit probabilities indicating a level of confidence in the corresponding hard decision, wherein the per-bit probabilities are N-bit values where N is an integer greater than one;
   soft modulation circuitry configured to:
      receive a plurality of the per-bit probabilities of the coded message that are mapped to different modulation symbols from the per-bit decoder, the plurality of the per-bit probabilities being less than the per-bit probabilities of the coded message;
      calculate a composite probability comprising a normalized weighted sum of the plurality of the per-bit probabilities of the coded message;
      receive the calculated hard decisions from the per-bit decoder;
      calculate a weighted sum of a subset of possible modulated states of a modulation scheme used by a transmitter of the coded message based on the received hard decisions and the composite probability; and
      regenerate a transmitted modulated signal corresponding to the coded message based on the a weighted sum, wherein the at least one composite probability is reused in calculation of a plurality of different regenerated modulated symbols; and
   interference cancellation circuitry configured to subtract the regenerated modulated signal from a received signal in which a plurality of distinct signals have been allocated the same time and frequency resources on a wireless communication channel, the subtraction being performed between iterations of the interference cancellation circuitry.

15. The User Equipment of claim 14, wherein the per-bit decoder is one of a turbo decoder, a Low Density Parity Check decoder and a Viterbi decoder.

16. A method of performing interference cancellation in a wireless communication system having a decoder and a soft modulator, the method comprising:
   decoding, by the decoder, a coded message to generate hard decisions and per-bit probabilities for bits of the coded message, the per-bit probabilities representing a probability that the hard decision of the decoder for a given bit is correct;
   receiving, by the soft modulator, a subset of per-bit probabilities of a set comprising a per-bit probability for each bit of the coded message from the decoder, the subset of per-bit probabilities corresponding to bits of the coded message mapped to more than one modulation symbol;
   selectively combining, by the soft modulator, the subset of per-bit probabilities to calculate at least one combined per-bit probability, wherein the at least one combined per-bit probability is used more than once in calculation of a given weighted sum, and wherein the subset of per-bit probabilities is less than the set of the per-bit probabilities of each bit of the coded message;
   receiving, by the soft modulator, the hard decisions from decoder;
   calculating, by the soft modulator, a weighted sum of a subset of possible modulation states based on a modulation scheme used by the transmitter, a subset of the received hard decisions and the at least one combined per-bit probability; and
   calculating an estimate of a transmitted modulated signal for the coded message based on the weighted sum; and
   using the estimate of the transmitted modulated signal to cancel interference in a received signal.

17. The method of claim 16, wherein the combined per-bit probability comprises a single value combining all of the per-bit probabilities corresponding to bits of the coded message contributing to the weighted sum.

18. A computer program product embodied on a non-transitory computer-readable medium comprising program instructions configured such that when executed by processing circuitry cause the processing circuitry to implement the method of claim 16.

19. Means for interference cancellation for reconstructing a wirelessly transmitted modulated signal in a receiver using output of a decoder for calculating per-bit probabilities corresponding to bit-by-bit estimates of a coded message, the decoder being configured to calculate, a single-bit hard decision and a multi-bit soft decision for at least a subset of the bit-by-bit estimates, the hard decision representing a binary value for the bit of the coded message and the soft decision representing a probability that the corresponding hard decision for the bit is correct, the circuitry comprising:
   means for soft modulation configured to modulate the bit-by-bit estimates of the coded message generated by the decoder and to reconstruct the transmitted modulated signal from a weighted superposition of a plurality of possible modulated states, the weighted superposition depending upon the hard decisions and at least one combined value, the combined value being calculated by combining a plurality of the multi-bit soft decisions corresponding to different bits of the coded message mapped to different modulation symbols, the at least one combined value being reused in calculation of a plurality of different reconstructed modulated symbols.

* * * * *